(12) United States Patent
Tsai et al.

(10) Patent No.: US 12,627,235 B2
(45) Date of Patent: May 12, 2026

(54) FORWARD CONVERTER AND FORWARD POWER FACTOR CORRECTOR

(71) Applicant: INDUSTRIAL TECHNOLOGY RESEARCH INSTITUTE, Hsinchu (TW)

(72) Inventors: Wen-Tien Tsai, Pingtung County (TW); Ching-Ran Lee, Kinmen County (TW); Le-Ren Chang-Chien, Tainan City (TW); Chun-Wei Lin, Taipei City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 138 days.

(21) Appl. No.: 18/416,742

(22) Filed: Jan. 18, 2024

(65) Prior Publication Data

US 2025/0015724 A1     Jan. 9, 2025

Related U.S. Application Data

(60) Provisional application No. 63/525,139, filed on Jul. 5, 2023.

(30) Foreign Application Priority Data

Sep. 27, 2023   (TW) ................................. 112137010

(51) Int. Cl.
   *H02M 3/335*      (2006.01)
   *H02M 1/42*       (2007.01)
(52) U.S. Cl.
   CPC ..... *H02M 3/33553* (2013.01); *H02M 1/4258* (2013.01)

(58) Field of Classification Search
   CPC .......... H02M 3/22; H02M 3/24; H02M 3/315; H02M 3/335; H02M 3/33507;
   (Continued)

(56) References Cited

U.S. PATENT DOCUMENTS 5,636,114 A * 6/1997 Bhagwat .......... H03K 17/08142
                                                        363/56.12
5,708,571 A    1/1998 Shinada
                    (Continued)

FOREIGN PATENT DOCUMENTS

CN        112234807 A      1/2021
DE          3537536 A1     4/1987
                    (Continued)

OTHER PUBLICATIONS

Changchien, S.K. et al., "A Demagnetization Circuit for Single-Ended Forward Converter," The 33rd Annual Conference of the IEEE Industrial Electronics Society (IECON), pp. 1390-1395 (Nov. 5-8, 2007).
(Continued)

*Primary Examiner* — Thienvu V Tran
*Assistant Examiner* — Carlos O Rivera-Perez
(74) *Attorney, Agent, or Firm* — Maschoff Brennan

(57)                    ABSTRACT

A forward converter includes a voltage conversion device, a switch and an auxiliary device. The voltage conversion device includes a primary winding and a secondary winding, and is configured to convert an input voltage into an output voltage. The switch is connected to the voltage conversion device, and is switched to make the voltage conversion device receive or not receive the input voltage. The auxiliary device is connected to the voltage conversion device. When the switch is cut off, the auxiliary device stores electrical energy released by the voltage conversion device and generates a compensation voltage, and when the switch is turned
(Continued)

on, the auxiliary device provides the compensation voltage, wherein the compensation voltage and the input voltage have same polarity. The present disclosure further provides a forward power factor corrector including the forward converter described above and a rectifying device.

10 Claims, 31 Drawing Sheets

(58) Field of Classification Search
CPC ......... H02M 3/33515; H02M 3/33523; H02M 3/3353; H02M 3/33538; H02M 3/33546; H02M 3/3355; H02M 3/333576; H02M 3/155; H02M 3/1566; H02M 1/0016; H02M 1/0019; H02M 1/0022; H02M 1/0064; H02M 1/0067; H02M 1/007; H02M 1/123; H02M 1/126; H02M 1/14; H02M 1/143; H02M 1/146; H02M 1/15; H02M 1/16; H02M 1/32; H02M 1/34–348; H02M 1/42; H02M 1/4208; H02M 1/4216; H02M 1/4233; H02M 1/4241; H02M 1/4258; H02M 1/4266; H02M 1/4275; H02M 1/4283; H02M 1/44; H02M 7/02; H02M 7/04; H02M 7/062; H02M 7/12; H02M 7/155
USPC .. 363/15–21.18, 37, 40–47, 50–58, 89, 123, 363/124, 131–134; 323/205–211, 222, 323/266, 271–276, 282–288, 351, 908
See application file for complete search history.

(56) References Cited

U.S. PATENT DOCUMENTS

| | | | |
|---|---|---|---|
| 8,009,448 | B2 | 8/2011 | Liu |
| 2013/0169242 | A1 | 7/2013 | Tsai et al. |
| 2014/0035477 | A1 | 2/2014 | Han et al. |
| 2021/0384830 | A1 | 12/2021 | Bertolini et al. |
| 2022/0399804 | A1 | 12/2022 | Rehlaender et al. |

FOREIGN PATENT DOCUMENTS

| | | |
|---|---|---|
| EP | 2 693 619 A2 | 2/2014 |
| JP | S6031624 A | 2/1985 |
| JP | S61280769 A | 12/1986 |
| JP | H0739149 A | 2/1995 |
| JP | H08-23676 A | 1/1996 |
| JP | H11-191960 A | 7/1999 |
| JP | H11262253 A | 9/1999 |
| JP | 2002330585 A | 11/2002 |
| JP | 2009017714 A | 1/2009 |
| JP | 2013141383 A | 7/2013 |
| TW | 201442408 A | 11/2014 |
| TW | 202139589 A | 10/2021 |
| WO | 2009101300 A2 | 8/2009 |
| WO | 2011113307 A1 | 9/2011 |

OTHER PUBLICATIONS

Hsu, C.Y. et al., "A Single Stage Single Switch Valley Switching Flyback-Forward Converter with Regenerative Snubber and PFC for LED Light Source System," International Conference on Intelligent Green Building and Smart Grid (IGBSG), (2014).
"300 W Non-PFC Stage Forward Power Supply Using HiperTFS TM-2 TFS7707H," Power Integrations, pp. 1-68 (Nov. 19, 2015).
Tsai, C.-T. et al., "An improved forward converter with PFC and ZVS features for split-phase charger applications," Computers and Electrical Engineering, vol. 51, pp. 291-303 (2016).
Xie, X. et al., "Study on the Single-Stage Forward-Flyback PFC Converter With QR Control," IEEE Transactions on Power Electronics, vol. 31, Issue 1, pp. 430-442 (Jan. 2016).
EU Extended European Search Report dated Nov. 29, 2024 in application 24185495.9.
Wen-Tien Tsai et al., "A Modified Forward PFC Converter for LED Lighting Applications," Oct. 27, 2022.
Yoon Choi et al.,"High efficiency and high power factor single-stage balanced forward-flyback converter," Nov. 10, 2013.
JP Office Action dated Dec. 10, 2024 as received in Application No. 2024-046449.
TW Office Action dated Nov. 1, 2024 in application 112137010.
JP Office Action dated Feb. 24, 2026 in application No. 2024-046449.

* cited by examiner

100'

FORWARD CONVERTER AND FORWARD POWER FACTOR CORRECTOR

CROSS-REFERENCE TO RELATED APPLICATIONS

This non-provisional application claims priority under 35 U.S.C. § 119(a) on Patent Application No(s). 63/525,139 filed in U.S. on Jul. 5, 2023 and Patent Application No(s). 112137010 filed in Republic of China (ROC) on Sep. 27, 2023, the entire contents of which are hereby incorporated by reference.

BACKGROUND

1. Technical Field

This disclosure relates to a forward converter and forward power factor corrector.

2. Related Art

At present, many electrical appliances use low-voltage direct current. However, since power provided by the supply mains is alternating current (AC), alternating current-direct current conversion is required. In order to reduce the reactive power of the power system and reduce the system interference caused by current harmonics, many electrical appliances are required to have high power factor and low current harmonics, so power factor correctors are widely used.

Based on safety and performance considerations, power factor correctors are required to have high power factor, high conversion efficiency and electrical isolation. Conventional circuit structures such as fly-back structure have poor conversion efficiency; and for conventional forward circuits, when the input AC power is in a low voltage state, if the induced voltage on the secondary side is less than the output voltage of the power factor corrector, the input current cannot be introduced, resulting in a current dead zone. Therefore, the power factor correction effect is compromised, and additional transformer is needed to deal with demagnetization requirement. Other conventional technologies and circuit structures also face different technical bottlenecks and cannot meet increasingly stringent regulatory requirements.

SUMMARY

According to one or more embodiment of this disclosure, a forward converter includes a voltage conversion device, a switch and an auxiliary device. The voltage conversion device includes a primary winding and a secondary winding and is configured to convert an input voltage into an output voltage. The switch is connected to the voltage conversion device and is configured to be switched to make the voltage conversion device receive or not receive the input voltage. The auxiliary device is connected to the voltage conversion device, stores electrical energy released by the voltage conversion device and generating a compensation voltage when the switch is cut off, and providing the compensation voltage when the switch is turned on, wherein the compensation voltage and the input voltage have same polarity.

According to one or more embodiment of this disclosure, a forward power factor corrector includes the forward converter described above and a rectifying device connected to the forward converter and configured to receive and rectify a power source to generate the input voltage.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
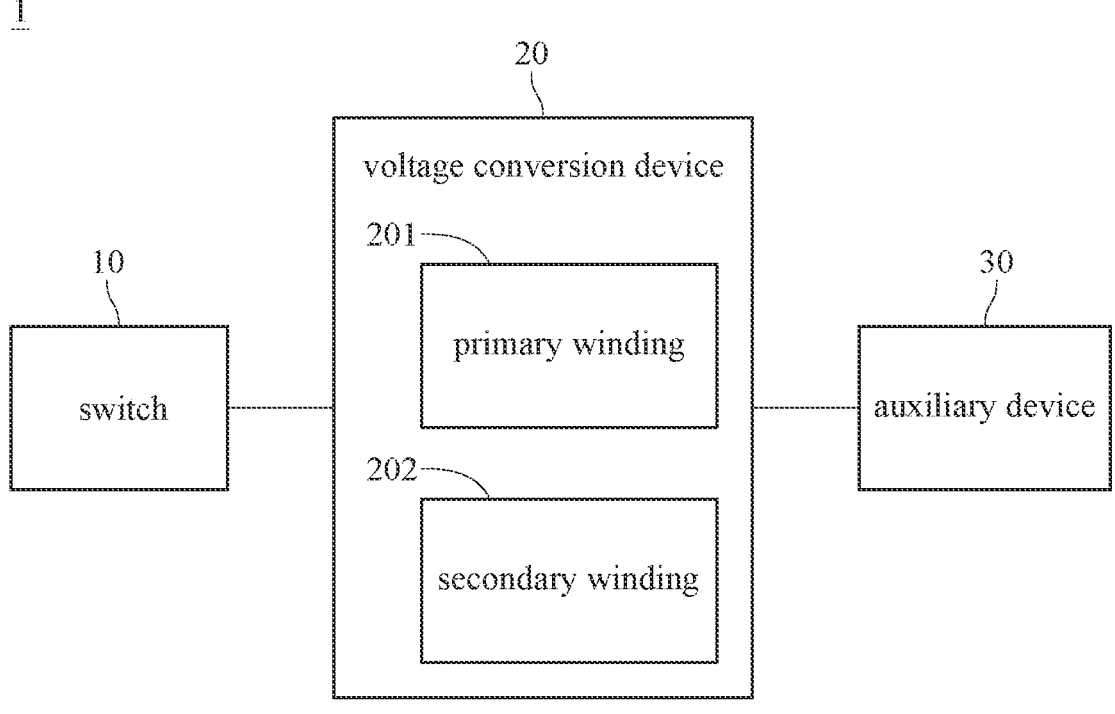
FIG. 1 is a block diagram illustrating a forward converter according to an embodiment of the present disclosure.

Please refer to FIG. 1, wherein FIG. 1 is a block diagram illustrating a forward converter according to an embodiment of the present disclosure. As shown in FIG. 1, the forward converter 1 includes a switch 10, a voltage conversion device 20 and an auxiliary device 30. The switch 10 is connected to the voltage conversion device 20, and the voltage conversion device 20 is connected to the auxiliary device 30.

The switch 10 is configured to be switched to make the voltage conversion device 20 receive or not receive an input voltage. For example, the switch 10 may be an active power switch element, and is configured to be triggered to be cut off or turned on, so that the voltage conversion device 20 receives or does not receive the input voltage.

The voltage conversion device 20 includes a primary winding 201 and a secondary winding 202, and the voltage conversion device 20 is configured to convert the input voltage into the output voltage. The primary winding 201 and the secondary winding 202 each includes one or more coils. In an implementation, the voltage conversion device 20 may further include a fly wheeling diode, an energy storage inductor and an output capacitor. A first terminal of the energy storage inductor may be configured to output the output voltage. A cathode of the fly wheeling diode and a second terminal of the energy storage inductor may be commonly connected to a first node, and the first node may be connected to the auxiliary device 30. A terminal of the output capacitor may be connected to another terminal of the energy storage inductor, and another terminal of the output capacitor may be connected to an anode of the fly wheeling diode.

The auxiliary device 30 may include one or more passive elements. A terminal of the auxiliary device 30 is connected to the secondary winding 202, and another terminal of the auxiliary device 30 is connected to the second terminal of the energy storage inductor of the voltage conversion device 20. Alternatively, a terminal of the auxiliary device 30 may be configured to receive the input voltage, and another terminal of the auxiliary device 30 is connected to the primary winding 201. When the switch 10 is cut off, the auxiliary device 30 stores energy released by the voltage conversion device 20 and generates a compensation voltage; and when the switch 10 is turned on, the auxiliary device 30 provides the compensation voltage, wherein the compensation voltage and the input voltage have same polarity.

By storing energy released by the voltage conversion device when the switch is cut off and generating the compensation voltage, the forward converter may have the function of demagnetization and may provide the compensation voltage when the switch is turned on. Specifically, in the application of an alternating current input, the compensation voltage may ease the situation of current dead zone.

Figure 2:
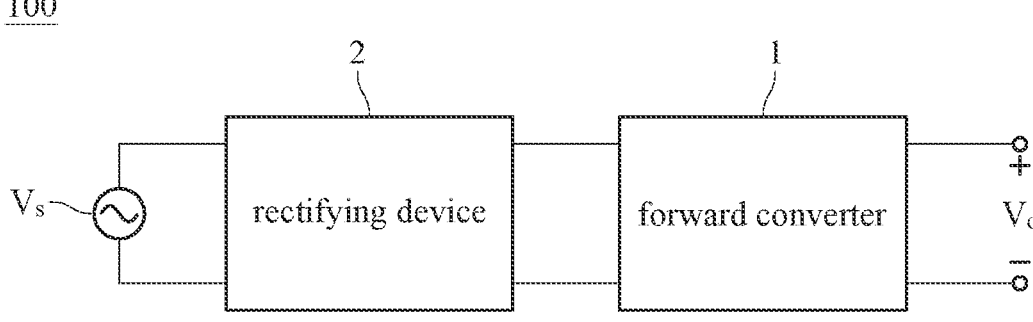
FIG. 2 is a block diagram illustrating a forward power factor corrector according to an embodiment of the present disclosure.

Please refer to FIG. 2, wherein FIG. 2 is a block diagram illustrating a forward power factor corrector according to an embodiment of the present disclosure. As shown in FIG. 2, the forward power factor corrector 100 includes a forward converter 1 and a rectifying device 2. The forward converter 1 may be the forward converter 1 shown in FIG. 1. The rectifying device 2 is connected to a power source $V_s$ and the forward converter 1. The rectifying device 2 is configured to receive and rectify the power source $V_s$ to generate the input voltage described above. Specifically, the power source $V_s$ may provide alternating current, the alternating current is converted into a direct current by the rectifying device 2, and the direct current is provided to the forward converter 1. The forward converter 1 converts the input voltage into the output voltage $V_o$, wherein the output voltage $V_o$ may be output to a load connected to the forward converter 1.

Figure 3:
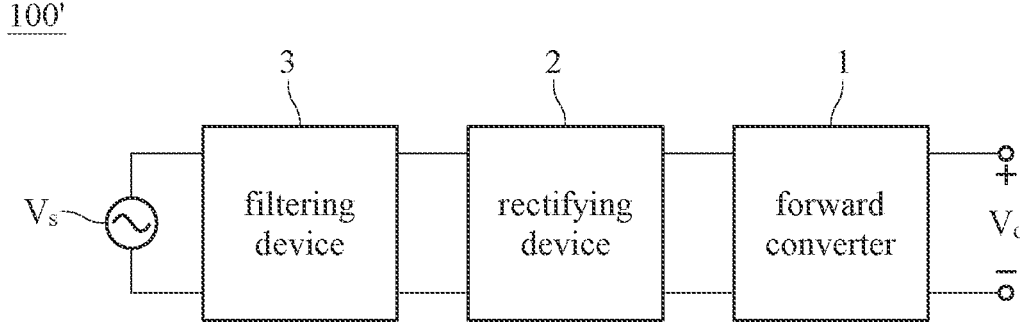
FIG. 3 is a block diagram illustrating a forward power factor corrector according to another embodiment of the present disclosure.

Please refer to FIG. 3, wherein FIG. 3 is a block diagram illustrating a forward power factor corrector according to another embodiment of the present disclosure. As shown in FIG. 3, the forward power factor corrector 100' includes a forward converter 1, a rectifying device 2 and a filtering device 3. The rectifying device 2 is connected to the forward converter 1 and the filtering device 3, wherein the connection and operation of the forward converter 1 and the rectifying device 2 are the same as the embodiment described above, and their detail descriptions are not repeated herein. In this embodiment, the filtering device 3 is connected between the rectifying device 2 and the power source $V_s$, to first filter the alternating current and then transmit the filtered alternating current to the rectifying device 2 to perform alternating current-direct current conversion.

Figure 4:
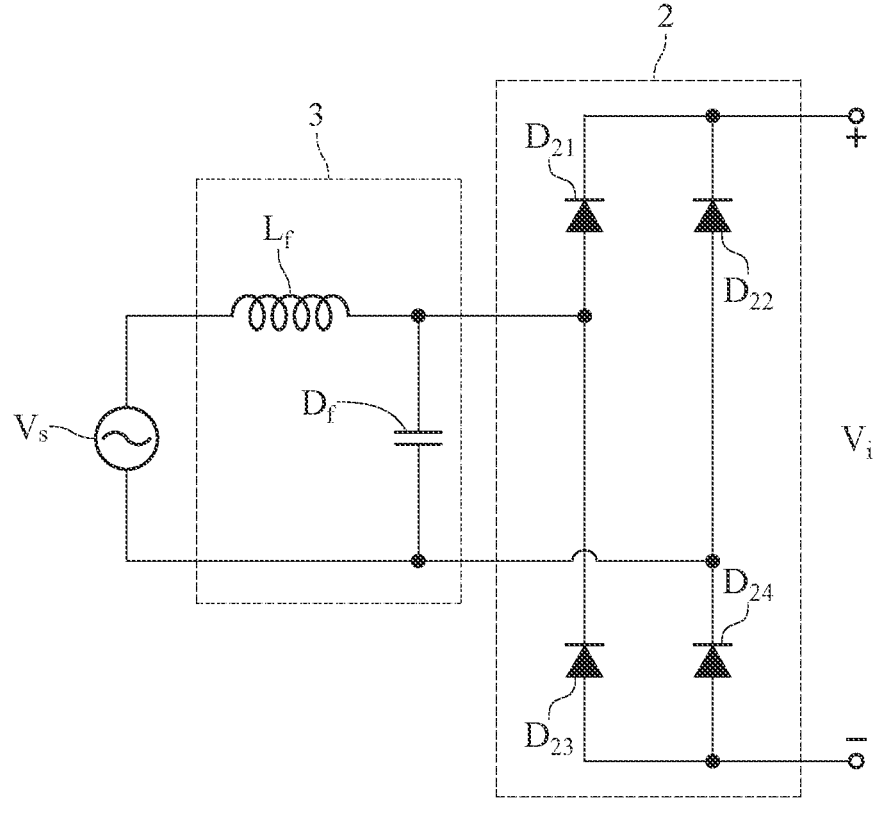
FIG. 4 exemplarily illustrates a circuit diagram of a rectifying device and a filtering device included in forward power factor of FIG. 3.

To further explain circuits of the filtering device 3 and the rectifying device 2, please refer to FIG. 4, wherein FIG. 4 exemplarily illustrates circuit diagrams of the rectifying device 2 and the filtering device 3 included in the forward power factor corrector 100' of FIG. 3. As shown in FIG. 4, the rectifying device 2 may include a first diode $D_{21}$, a second diode $D_{22}$, a third diode $D_{23}$ and a fourth diode $D_{24}$. An anode of the first diode $D_{21}$ is connected to a cathode of the third diode $D_{23}$. A cathode of the first diode $D_{21}$ is connected to a cathode of the second diode $D_{22}$. An anode of the second diode $D_{22}$ is connected to a cathode of the fourth diode $D_{24}$. An anode of the third diode $D_{23}$ is connected to an anode of the fourth diode $D_{24}$. The filtering device 3 may include a capacitor $D_f$ and an inductor $L_f$. A first terminal of the capacitor $D_f$ is connected to a first terminal of the inductor $L_f$, an anode of the first diode $D_{21}$ and a cathode of the third diode $D_{23}$. A second terminal of the capacitor $D_f$ is connected to the power source $V_s$, an anode of the second diode $D_{22}$ and a cathode of the fourth diode $D_{24}$. A second terminal of the inductor $L_f$ is connected to the power source $V_s$.

The filtering device 3 is configured to receive and filter the power source $V_s$ to generate the filtered power source $V_s$. The rectifying device 2 is configured to receive and rectify the filtered power source $V_s$ to form the input voltage $V_i$ between the cathode of the second diode $D_{22}$ and the anode of the fourth diode D24. The forward converter 1 converts the input voltage $V_i$ into the output voltage $V_o$, wherein the output voltage $V_o$ may be output to a load connected to the forward converter 1. It should be noted that FIG. 4 illustrates the basic circuit for implementing the rectifying device 2 and the filtering device 3, FIG. 4 does not intend to limit that the rectifying device 2 and the filtering device 3 can only be implemented by the circuit structure shown in FIG. 4. In addition, the filtering device 3 shown in FIG. 4 is selectively disposed.

Figure 5:
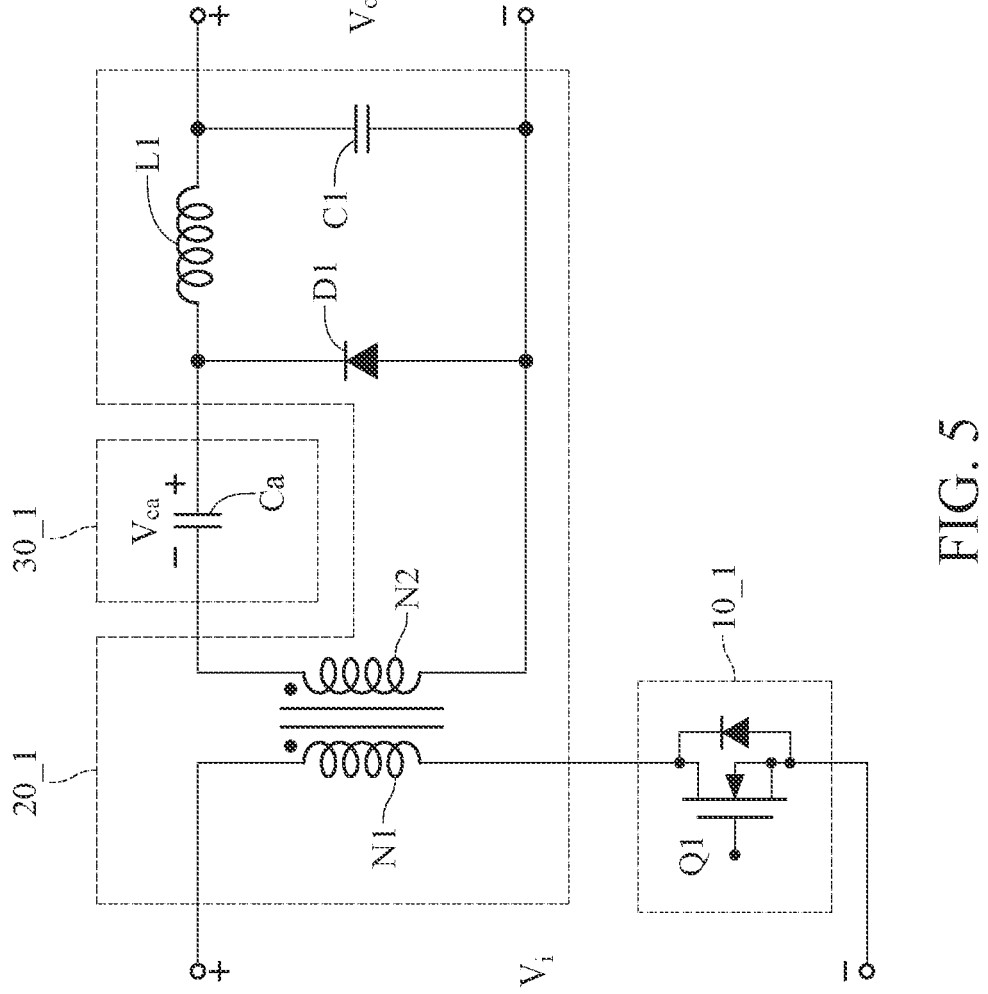
FIG. 5 is a circuit diagram of illustrating the forward converter according to a first embodiment of the present disclosure.

The following further explains embodiments for implementing the forward converter 1 described above. Please refer to FIG. 5, wherein FIG. 5 is a circuit diagram of illustrating the forward converter according to a first embodiment of the present disclosure. As shown in FIG. 5, the forward converter 1_1 includes a switch 10_1, a voltage conversion device 20_1 and an auxiliary device 30_1.

The switch 10_1 includes an active power switch element Q1. The voltage conversion device 20_1 includes a primary winding N1 and a secondary winding N2, the fly wheeling diode D1 as described above, an energy storage inductor L1 and an output capacitor C1. The auxiliary device 30_1 includes an auxiliary capacitor Ca.

Specifically, the first terminal of the energy storage inductor L1 is configured to output the output voltage $V_o$, and the second terminal of the energy storage inductor L1 is connected to the cathode of the fly wheeling diode D1. A terminal of the auxiliary capacitor Ca of the auxiliary device 30_1 is connected to the secondary winding N2, and another terminal of the auxiliary capacitor Ca is connected to the second terminal of the energy storage inductor L1 and the cathode of the fly wheeling diode D1.

Figure 6A:
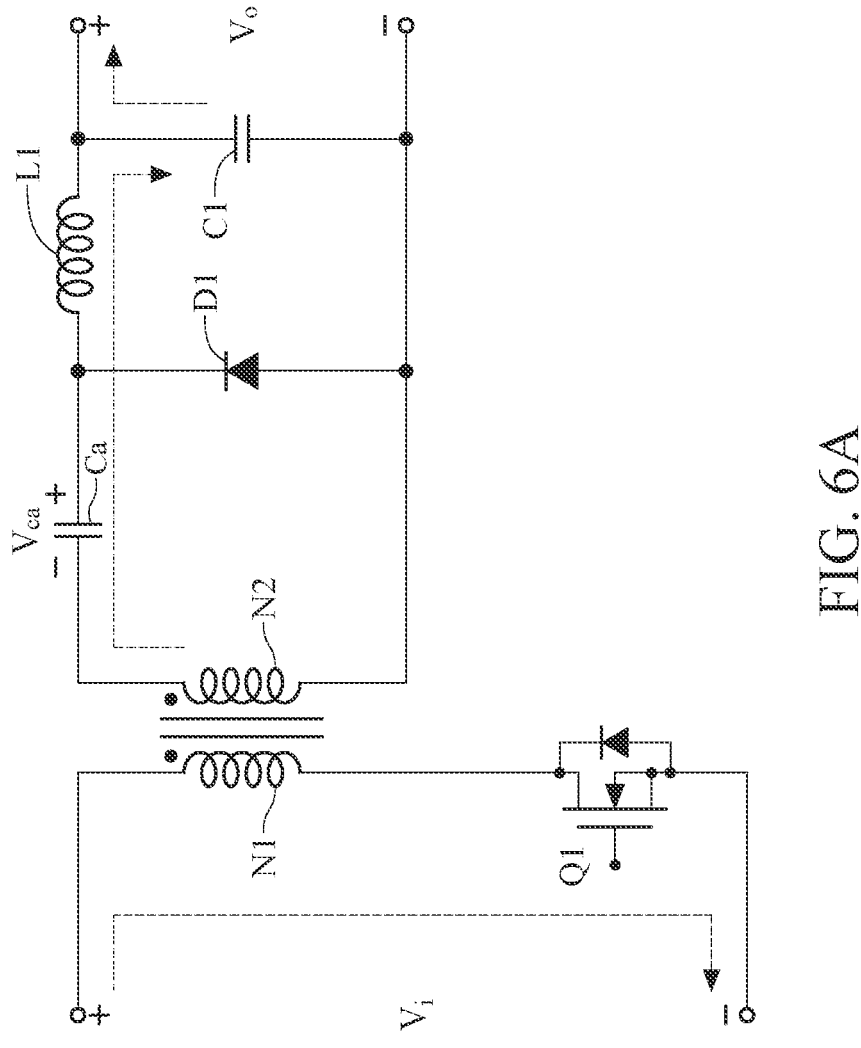
FIG. 6A to FIG. 6C illustrate a first operation mode, a second operation mode and a third operation mode of the forward converter of FIG. 5, respectively.
Figure 6B:
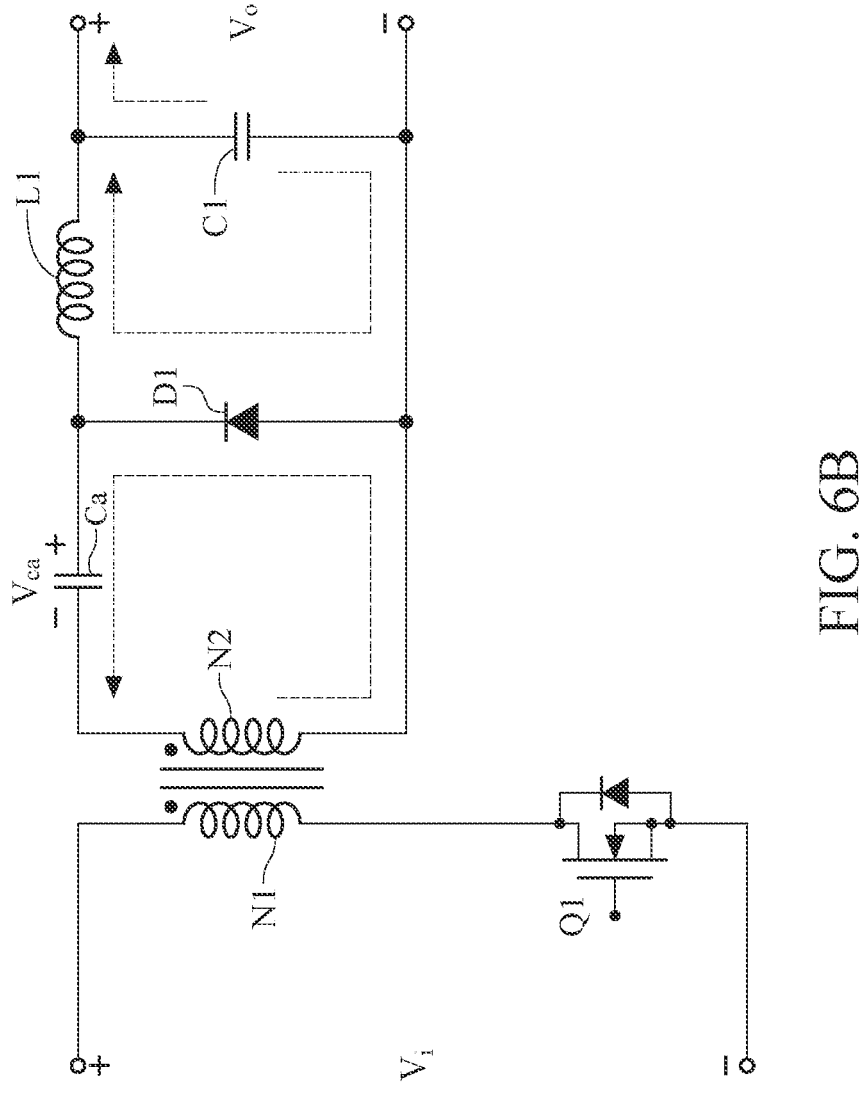
Figure 6C:
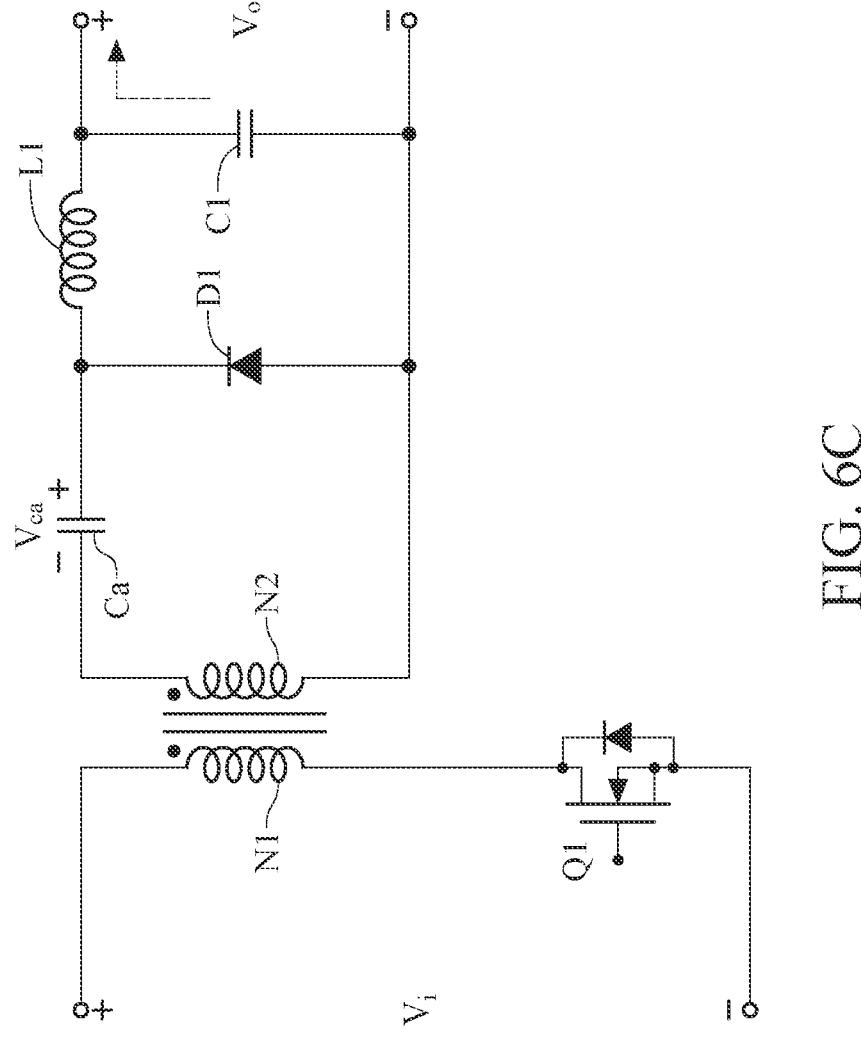

Please refer to FIG. 5 along with FIG. 6A to FIG. 6C, wherein FIG. 6A to FIG. 6C illustrate a first operation mode, a second operation mode and a third operation mode of the forward converter of FIG. 5, respectively.

Please refer to FIG. 6A, in the first operation mode, the active power switch element Q1 is turned on, and the fly wheeling diode D1 is cut off. When the active power switch element Q1 is turned on, the input voltage $V_i$ is provided to the primary winding N1 of the voltage conversion device 20_1, the induced voltage of the secondary winding N2 and the compensation voltage $V_{ca}$ of the auxiliary capacitor Ca of the voltage conversion device 20_1 both charge the output capacitor C1. At the same time, the energy storage inductor L1 stores energy, the auxiliary capacitor Ca is in a discharge state. This operation mode continues until the active power switch element Q1 is cut off, and the second operation mode is entered.

Please refer to FIG. 6B, in the second operation mode, the active power switch element Q1 is cut off, and the fly wheeling diode D1 is turned on. The magnetized secondary winding N2 may be demagnetized through the path formed from the fly wheeling diode D1 to the auxiliary capacitor Ca, and the auxiliary capacitor Ca may be charged to build the compensation voltage $V_{ca}$. The energy storage inductor L1 may release energy through the path formed from the output capacitor C1 and the fly wheeling diode D1. This operation mode continues until the secondary winding N2 and the energy storage inductor L1 discharge all energy, and the third operation mode is entered.

Please refer to FIG. 6C, in the third operation mode, the active power switch element Q1 and the fly wheeling diode D1 are cut off, the forward converter does not perform conversion. The energy stored by the output capacitor C1 may continue to provide current to the load. Then, when the active power switch element Q1 is turned on again, the energy stored by the auxiliary capacitor Ca is used to charge the output capacitor C1. That is, the forward converter 1_1 returns to the first operation mode of FIG. 6A. In particular, in an application where the forward converter of this embodiment is designed to operate in continuous current mode, the third operation mode may not need to exist. That is, after the second operation mode, the operation may directly return to the first operation mode.

Figure 7:
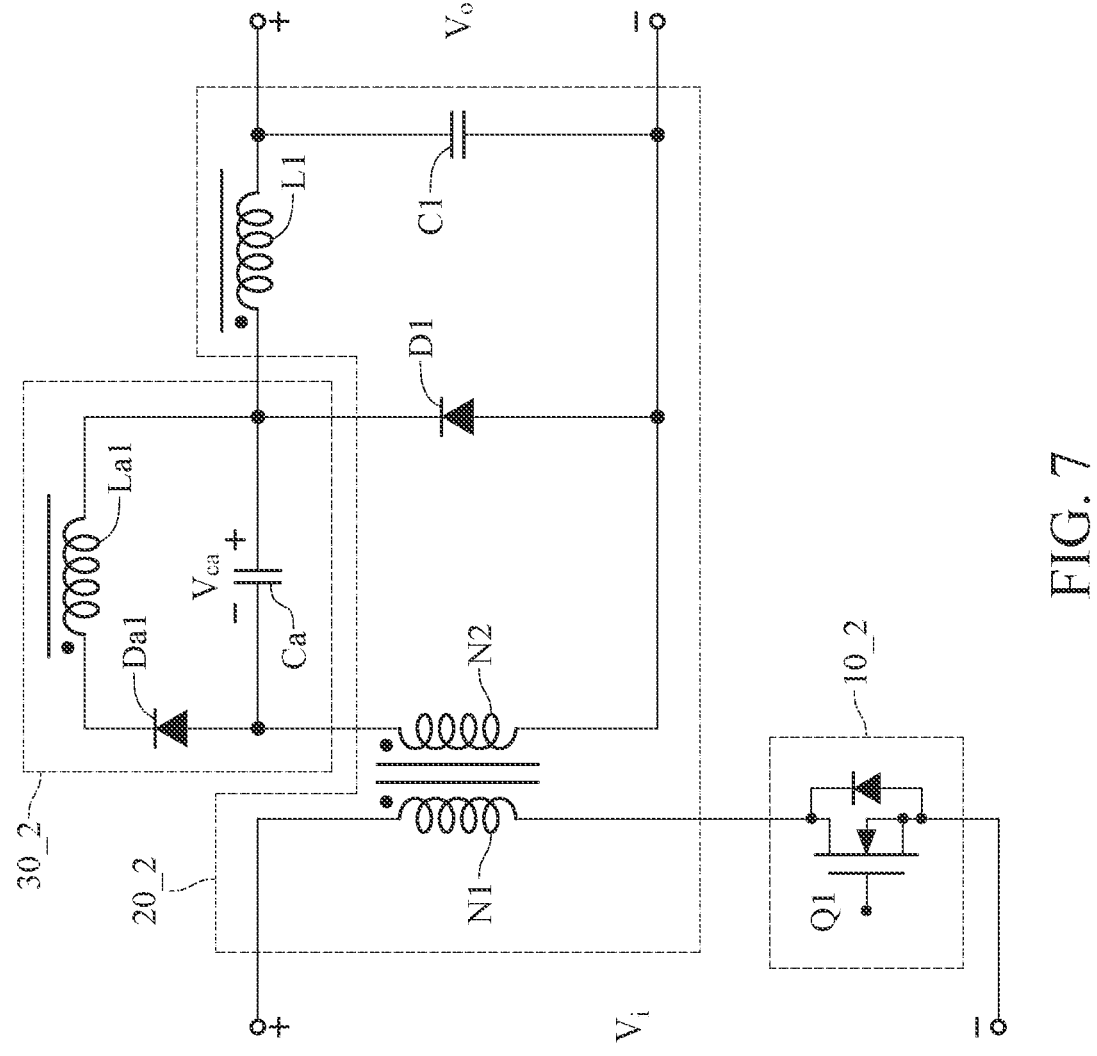
FIG. 7 is a circuit diagram of illustrating the forward converter according to a second embodiment of the present disclosure.

Please refer to FIG. 7, wherein FIG. 7 is a circuit diagram of illustrating the forward converter according to a second embodiment of the present disclosure. As shown in FIG. 7, the forward converter 1_2 includes a switch 10_2, a voltage conversion device 20_2 and an auxiliary device 30_2, wherein circuit/device implementations, functions and connections of the switch 10_2 and the voltage conversion device 20_2 may all be the same as the switch 10_1 and the voltage conversion device 20_1 included in the forward converter 1_1 of FIG. 5.

The auxiliary device 30_2 includes an auxiliary capacitor Ca, an auxiliary diode Da1 and an auxiliary winding La1. An anode of the auxiliary diode Da1 is connected to the first terminal of the auxiliary capacitor Ca. The auxiliary winding La1 is inductively coupled to the energy storage inductor L1 of the voltage conversion device 20_2. A terminal of the auxiliary winding La1 is connected to the cathode of the auxiliary diode Da1, and another terminal of the auxiliary winding La1 is connected to the second terminal of the auxiliary capacitor Ca.

Please refer to FIG. 7 and FIG. 8A to FIG. 8D, wherein FIG. 8A to FIG. 8D illustrate a first operation mode, a second operation mode, a third operation mode and a fourth operation mode of the forward converter of FIG. 7, respectively.

Figure 8A:
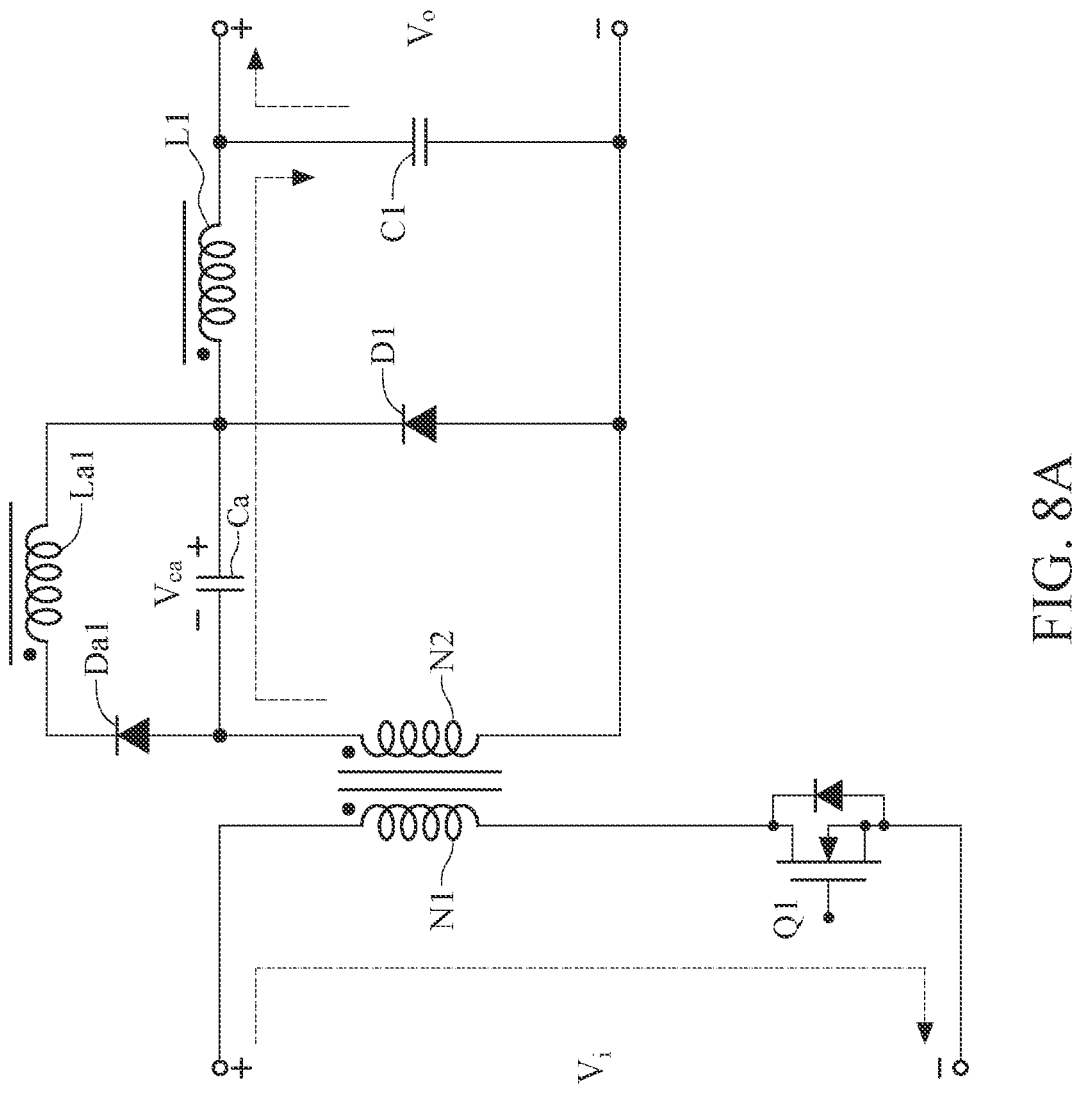
FIG. 8A to FIG. 8D illustrate a first operation mode, a second operation mode, a third operation mode and a fourth operation mode of the forward converter of FIG. 7, respectively.

Please refer to FIG. 8A, in the first operation mode, the active power switch element Q1 is turned on, the auxiliary diode Da1 is cut off, the fly wheeling diode D1 is cut off. When the active power switch element Q1 is turned on, the input voltage $V_i$ is provided to the primary winding N1 of the voltage conversion device 20_2. The induced voltage of the secondary winding N2 and the compensation voltage $V_{ca}$ of the auxiliary capacitor Ca of the voltage conversion device 20_2 both charge the output capacitor C1. At the same time, the energy storage inductor L1 stores energy, the auxiliary capacitor Ca is in a discharge state, and the compensation voltage $V_{ca}$ deceases. This operation mode continues until the active power switch element Q1 is cut off, and the second operation mode is entered.

Figure 8B:
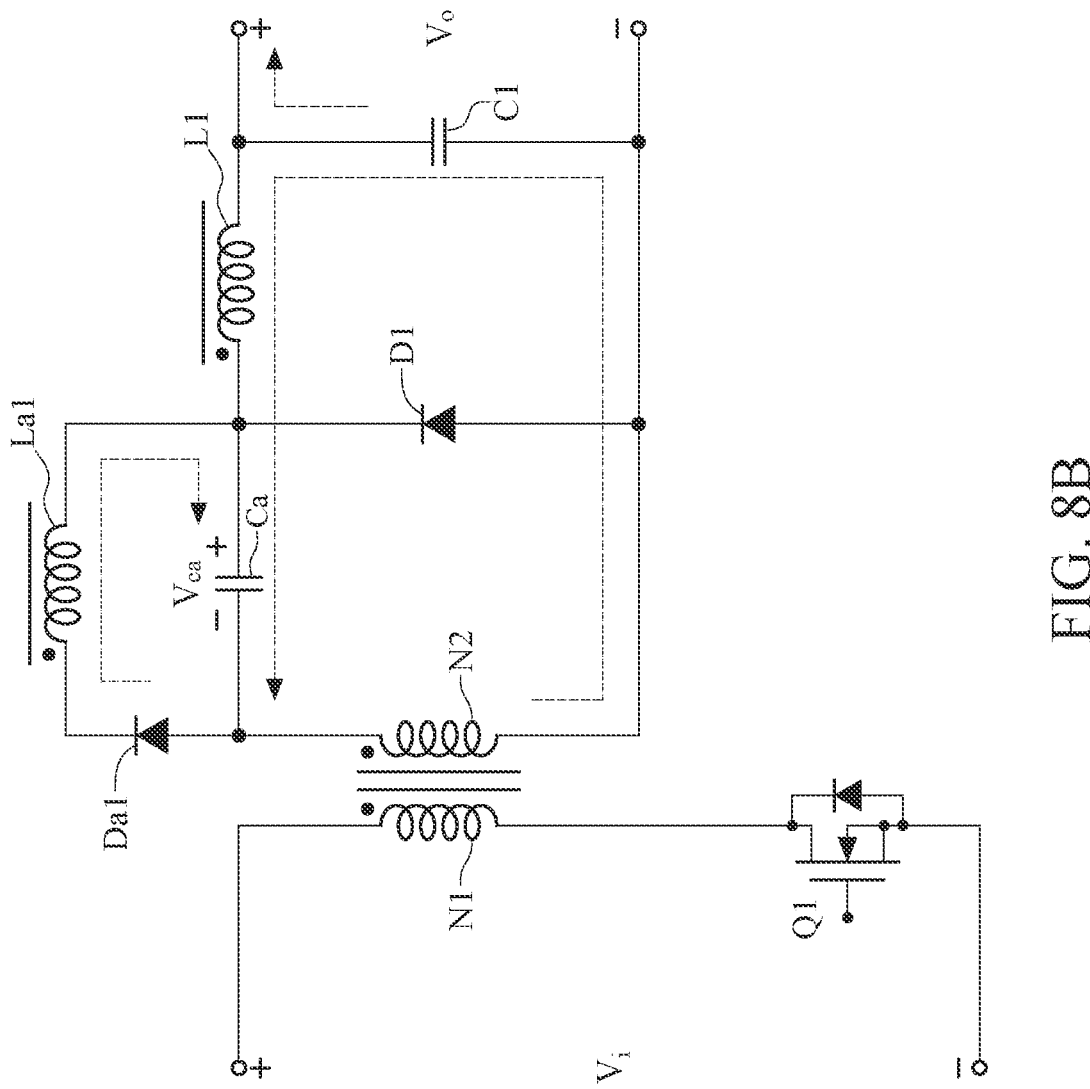

Please refer to FIG. 8B, in the second operation mode, the active power switch element Q1 is cut off, the auxiliary diode Da1 is turned on, the fly wheeling diode D1 is cut off. The magnetized secondary winding N2 may be demagnetized through the path formed from the auxiliary diode Da1 to the auxiliary capacitor Ca, and the auxiliary capacitor Ca may be charged to build the compensation voltage $V_{ca}$, and the compensation voltage $V_{ca}$ increases. The energy storage inductor L1 may discharge stored energy to the auxiliary capacitor Ca through the auxiliary winding La1. This operation mode continues until the compensation voltage $V_{ca}$ is equal to the first mapped voltage, and the third operation mode is entered. The first mapped voltage is an equivalent voltage of the output voltage $V_o$ mapped to the auxiliary winding La1 side according to a turn ratio of the energy storage inductor L1 and the auxiliary winding La1.

Figure 8C:
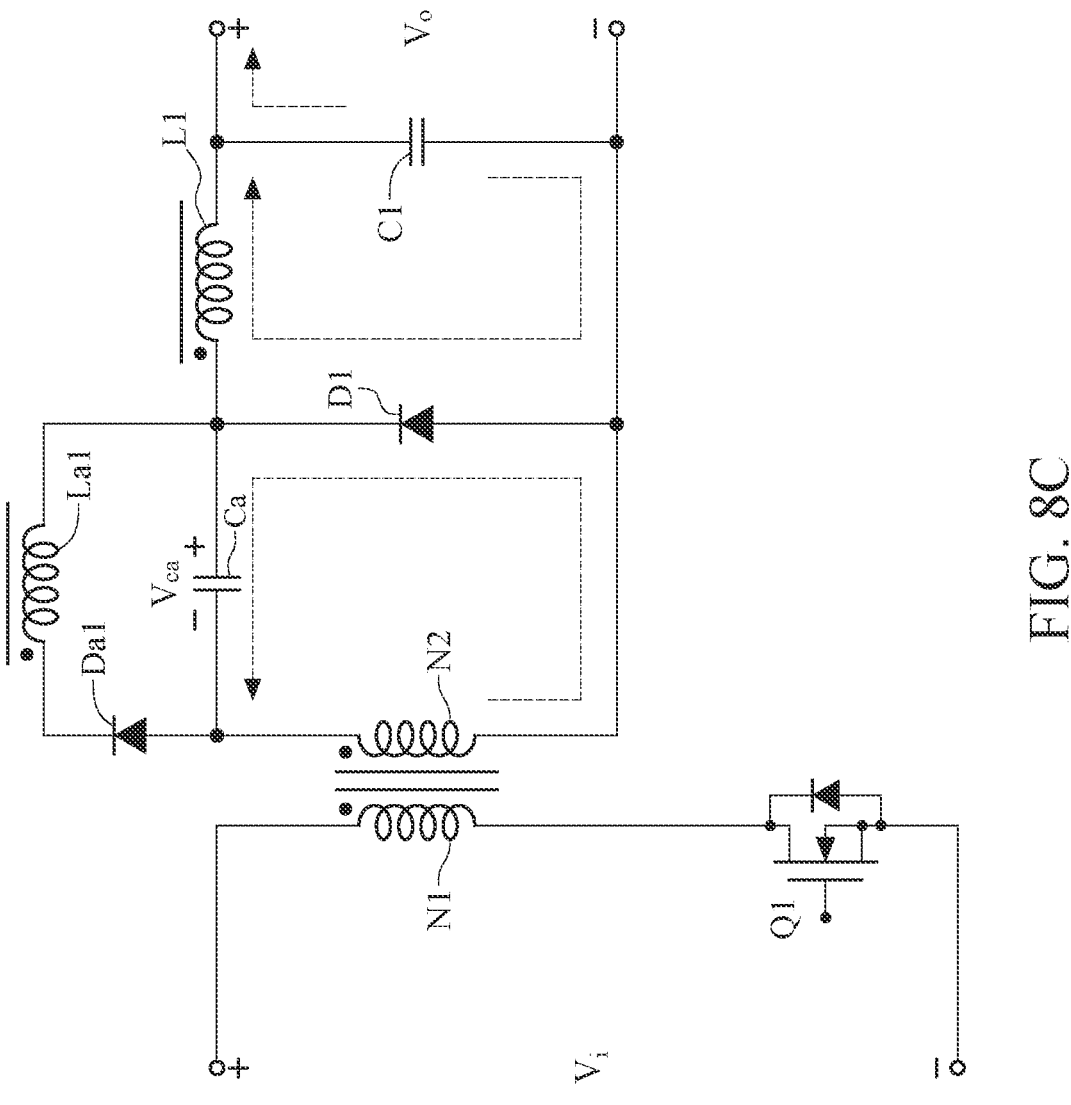

Please refer to FIG. 8C, in the third operation mode, the active power switch element Q1 is cut off, the auxiliary diode Da1 is cut off, the fly wheeling diode D1 is turned on. The magnetized secondary winding N2 is continuously demagnetized through the path formed from the fly wheeling diode D1 to the auxiliary capacitor Ca, and the auxiliary capacitor Ca may be charged to build the compensation voltage $V_{ca}$. The inductor L1 releases the stored energy through the path formed by the fly wheeling diode D1 and the output capacitor C1. This operation mode continues until all energy stored in the energy storage inductor L1 and the magnetized secondary winding N2 is released, and the fourth operation mode is entered.

Figure 8D:
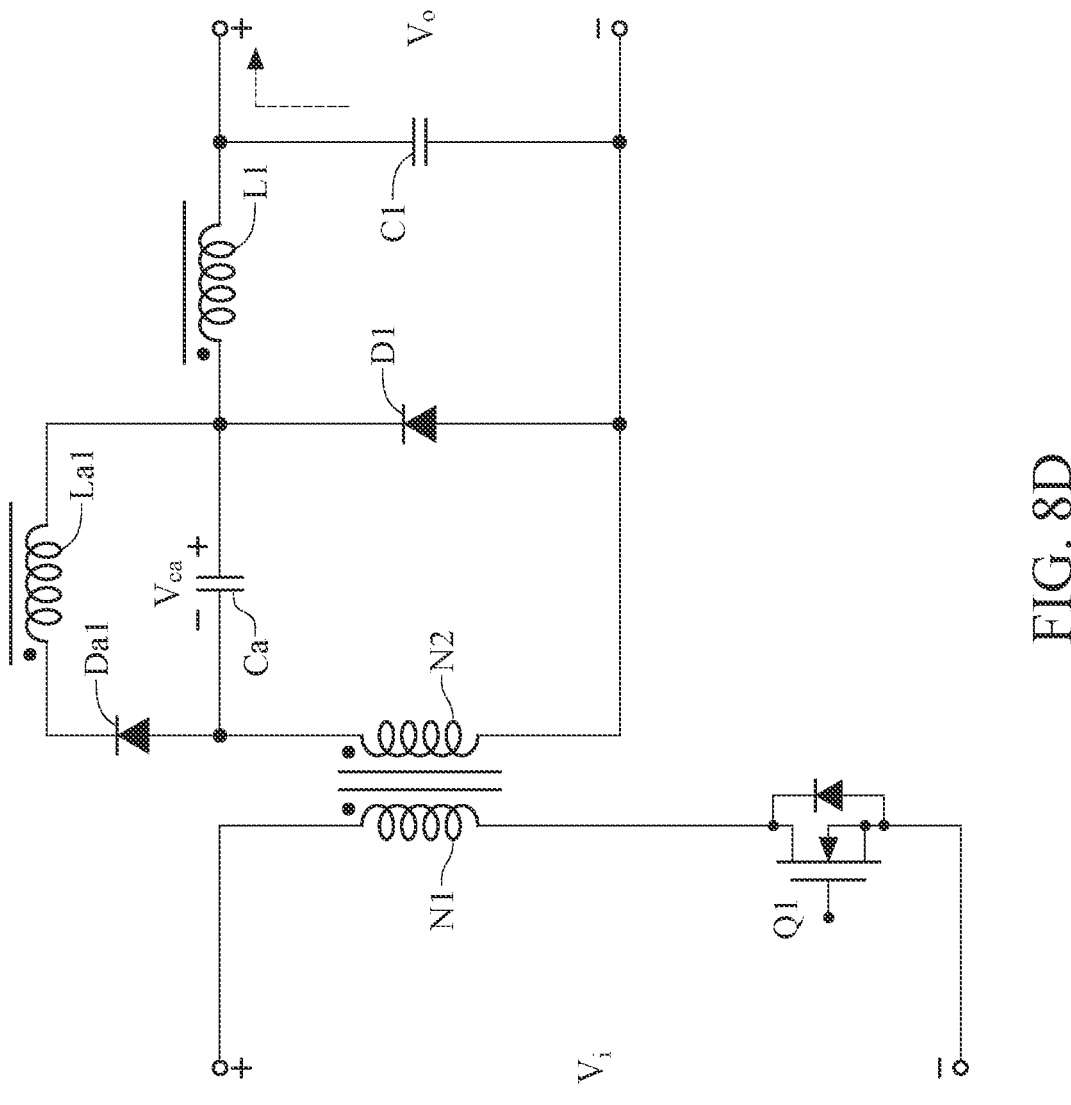

Please refer to FIG. 8D, in the fourth operation mode, the active power switch element Q1, the fly wheeling diode D1 and the auxiliary diode Da1 are cut off, and the forward converter does not perform conversion. The energy stored by the output capacitor C1 may continue to provide current to the load. Then, when the active power switch element Q1 is turned on again, energy stored by the auxiliary capacitor Ca is used to charge the output capacitor C1. That is, the forward converter 1_2 returns to the first operation mode of FIG. 8A. In particular, in an application where the forward converter of this embodiment is designed to operate in continuous current mode, the fourth operation mode may not need to exist. That is, after the third operation mode, the operation may directly return to the first operation mode.

Figure 9:
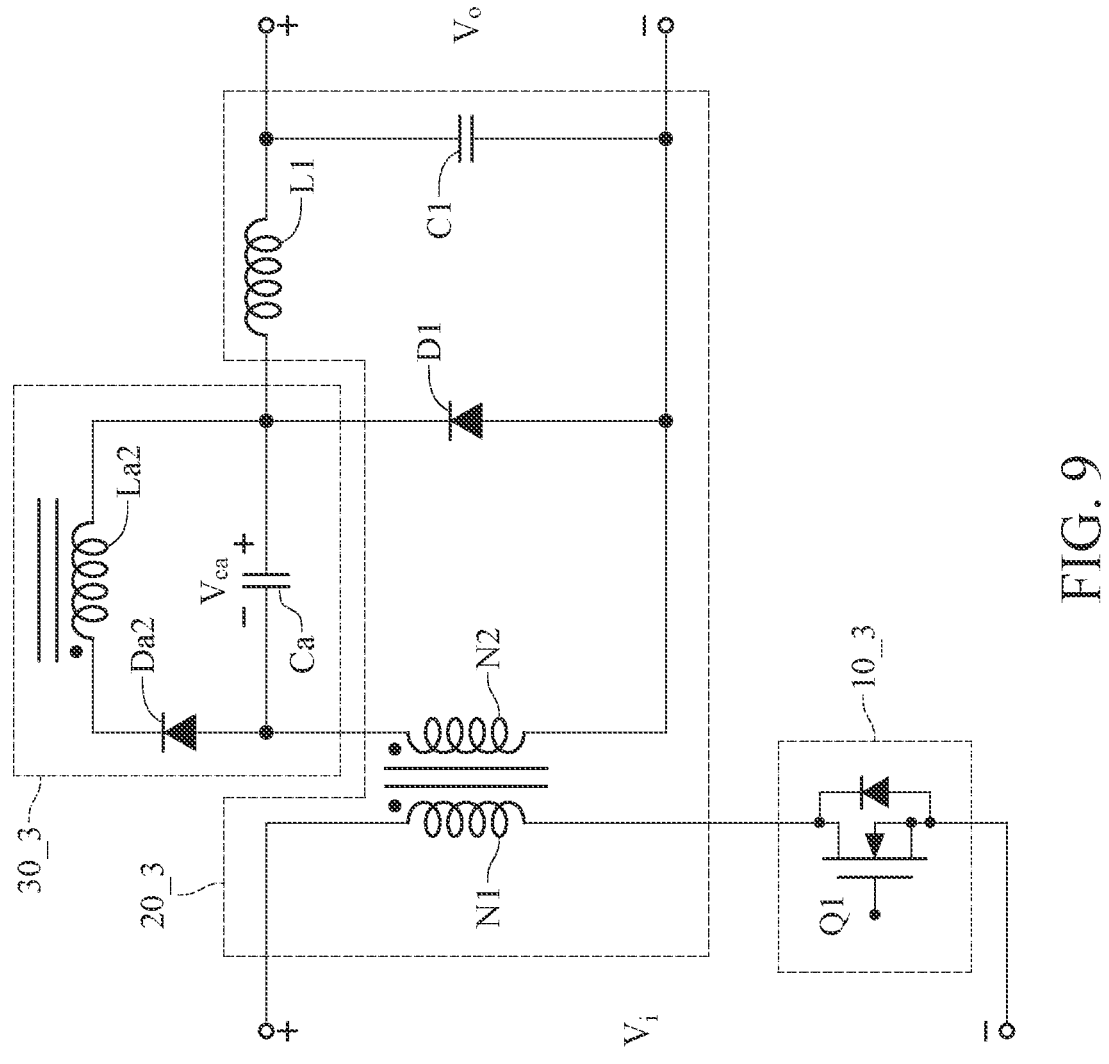
FIG. 9 is a circuit diagram of illustrating the forward converter according to a third embodiment of the present disclosure.

Please refer to FIG. 9, wherein FIG. 9 is a circuit diagram of illustrating the forward converter according to a third embodiment of the present disclosure. As shown in FIG. 9, the forward converter 1_3 includes a switch 10_3, a voltage conversion device 20_3 and an auxiliary device 30_3, wherein circuit/device implementations, functions and connections of the switch 10_3 and the voltage conversion device 20_3 may all be the same as the switch 10_1 and the voltage conversion device 20_1 included in the forward converter 1_1 of FIG. 5, and their detail descriptions are not repeated herein.

The auxiliary device 30_2 includes an auxiliary capacitor Ca, an auxiliary diode Da2 and an auxiliary winding La2. An anode of the auxiliary diode Da2 is connected to the first terminal of the auxiliary capacitor Ca. The auxiliary winding La2 is inductively coupled to the primary winding N1 and the secondary winding N2. A terminal of the auxiliary winding La2 is connected to the cathode of the auxiliary diode Da2, and another terminal of the auxiliary winding La2 is connected to the second terminal of the auxiliary capacitor Ca.

Figure 10A:
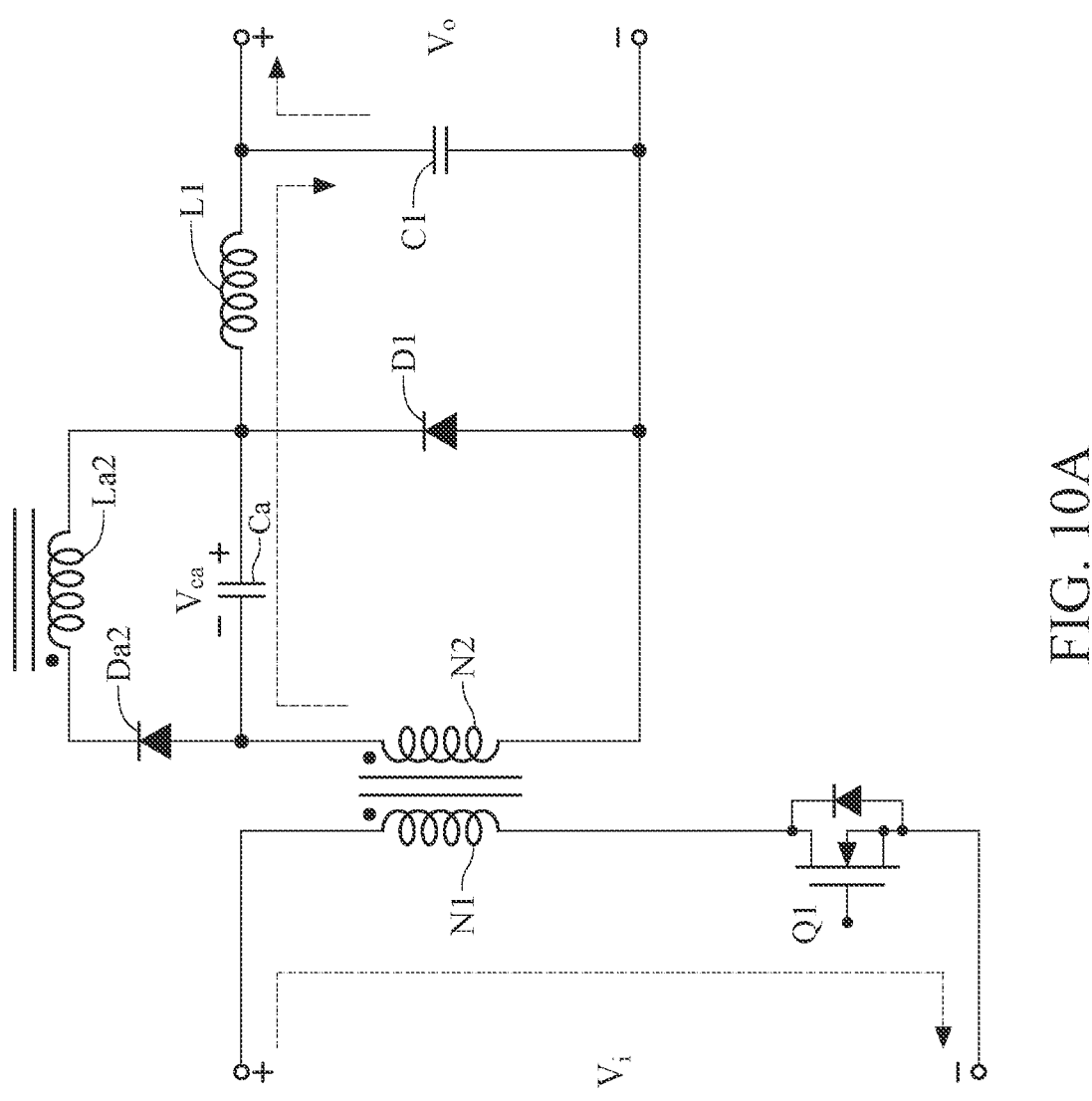
FIG. 10A to FIG. 10C illustrate a first operation mode, a second operation mode and a third operation mode of the forward converter of FIG. 9, respectively.
Figure 10B:
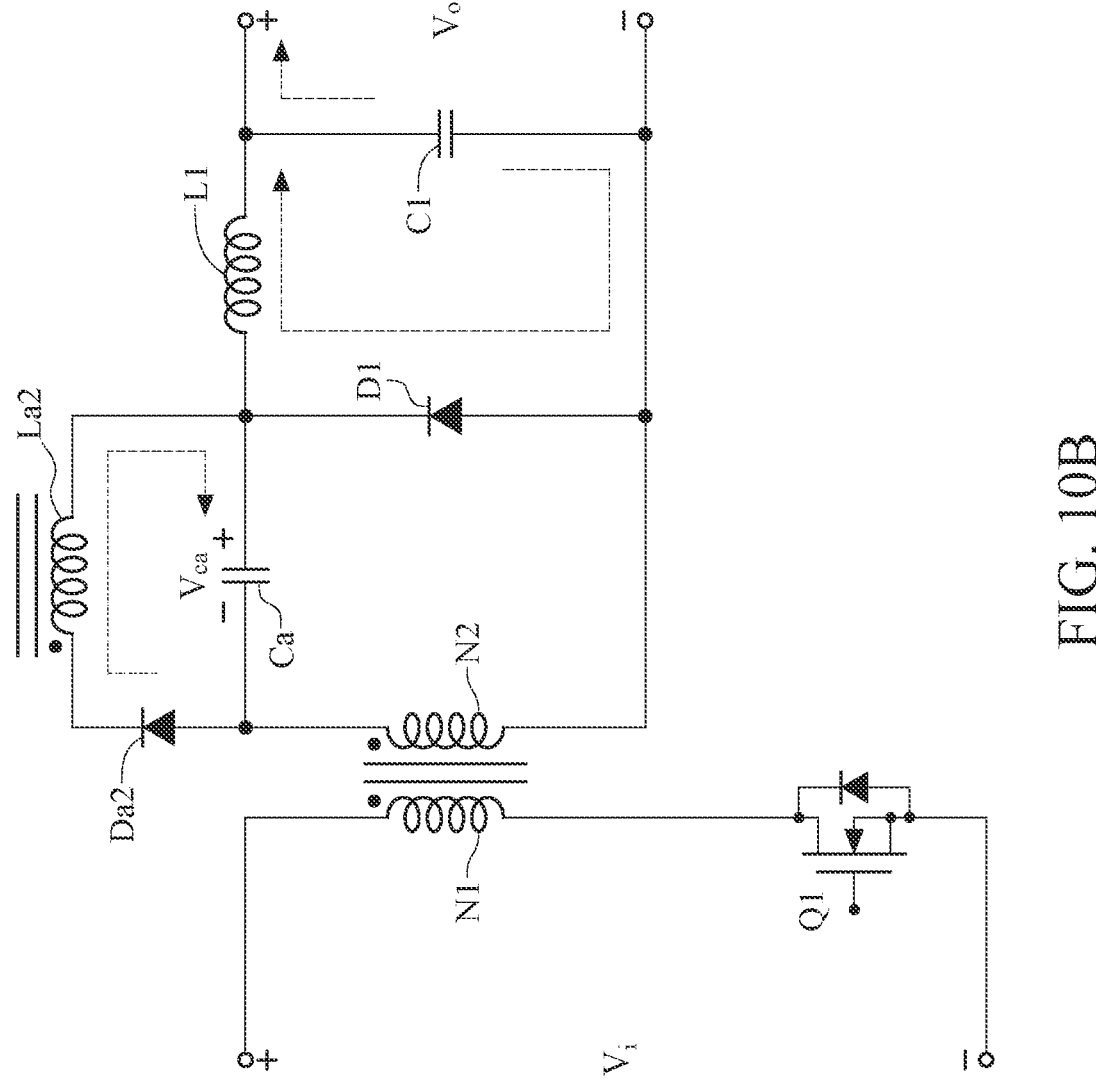
Figure 10C:
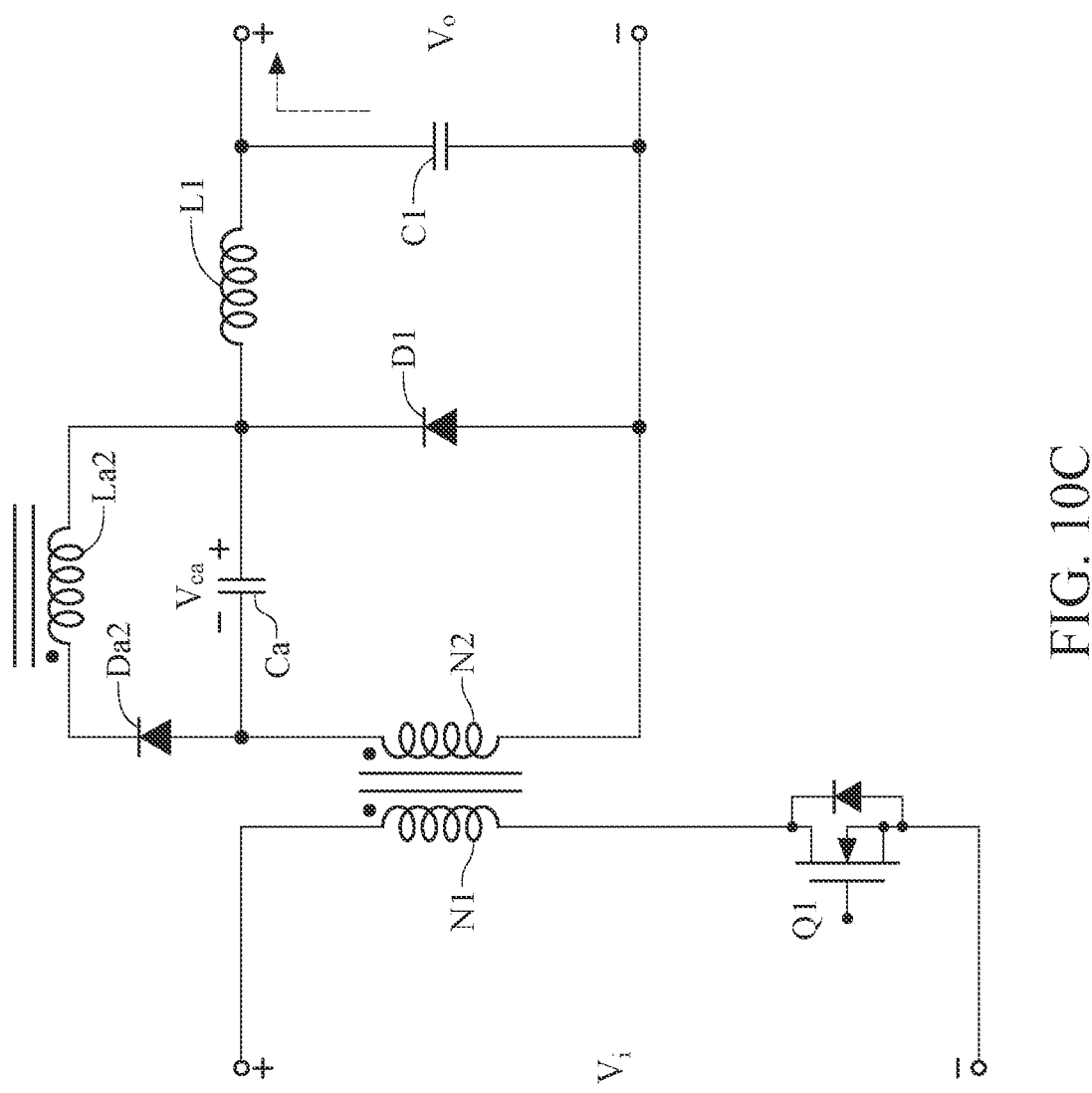

Please refer to FIG. 9 and FIG. 10A to FIG. 10C, wherein FIG. 10A to FIG. 10C illustrate a first operation mode, a second operation mode and a third operation mode of the forward converter of FIG. 9, respectively.

Please refer to FIG. 10A, in the first operation mode, the active power switch element Q1 is turned on, the auxiliary diode Da2 is cut off, the fly wheeling diode D1 is cut off. When the active power switch element Q1 is turned on, the input voltage $V_i$ is provided to the primary winding N1 of the voltage conversion device 20_3. The induced voltage of the secondary winding N2 and the compensation voltage $V_{ca}$ of the auxiliary capacitor Ca of the voltage conversion device 20_3 both charge the output capacitor C1. At the same time, the energy storage inductor L1 stores energy, the auxiliary capacitor Ca is in a discharge state. This operation mode continues until the active power switch element Q1 is cut off, and the second operation mode is entered.

Please refer to FIG. 10B, in the second operation mode, the active power switch element Q1 is cut off, the auxiliary diode Da2 is turned on, the fly wheeling diode D1 is cut off. Since the auxiliary winding La2 is inductively coupled to the primary winding N1 and the secondary winding N2, energy stored by the primary winding N1 and the secondary winding N2 may be released through the auxiliary winding La2 to perform demagnetization, and the auxiliary capacitor Ca may be charged to build the compensation voltage $V_{ca}$. The energy storage inductor L1 may release energy through the path formed by the output capacitor C1 and the fly wheeling diode D1. This operation mode continues until said demagnetization is completed, and the energy storage inductor L1 releases all energy. In particular, in some implementations, the demagnetization performed by the auxiliary winding La2 through the auxiliary diode Da2 and the auxiliary capacitor Ca and the energy release performed by the energy storage inductor L1 through the output capacitor C1 and the fly wheeling diode D1 may be completed at different timings. When the demagnetization of the auxiliary winding La2 and the energy release of the energy storage inductor L1 are both completed, the auxiliary device 30_2 enters the third operation mode.

Please refer to FIG. 10C, in the third operation mode, since energy stored by the energy storage inductor L1 is completely released, the current on the energy storage inductor L1 is reduced to zero, and after energy is completely released from the magnetized secondary winding N2 in the second operation mode, the current on the auxiliary capacitor Ca is reduced to zero, and the fly wheeling diode D1 and the auxiliary diode Da2 both enter the cut-off state, and the active power switch element Q1 is still in the cut-off state. The energy stored by the output capacitor C1 may continue to provide current to the load. When the active power switch element Q1 is triggered to be turned on again, energy stored by the auxiliary capacitor Ca is used to charge the output capacitor C1. That is, the forward converter 1_3 returns to the first operation mode. In particular, in the application where the forward converter of this embodiment is designed to operate in continuous current mode, the third operation mode may not need to exist. That is, after the second operation mode, the operation may directly return to the first operation mode.

Figure 11:
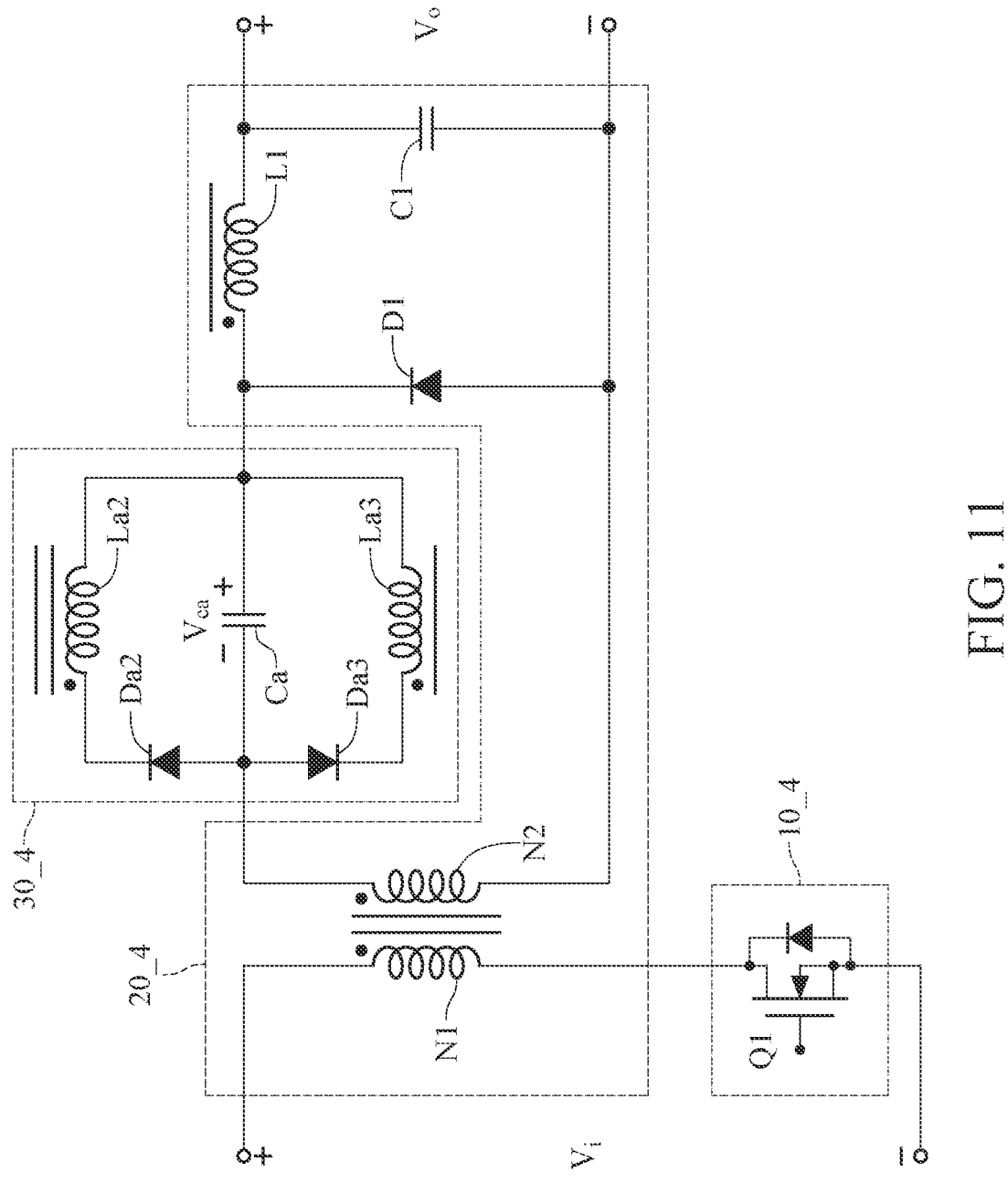
FIG. 11 is a circuit diagram of illustrating the forward converter according to a fourth embodiment of the present disclosure.

Please refer to FIG. 11, wherein FIG. 11 is a circuit diagram of illustrating the forward converter according to a fourth embodiment of the present disclosure. As shown in FIG. 11, the forward converter 1_4 includes a switch 10_4, a voltage conversion device 20_4 and an auxiliary device 30_4, wherein circuit/device implementations, functions and connections of the switch 10_4 may all be the same as that of the switch 10_1 included in the forward converter 1_1 of FIG. 5, and circuit/device implementations, functions and connections of the voltage conversion device 20_4 may all be the same as that of the voltage conversion device 20_2 included in the forward converter 1_2 of FIG. 7, and their detail descriptions are not repeated herein.

The auxiliary device 30_4 includes an auxiliary capacitor Ca, a first auxiliary diode Da2, a first auxiliary winding La2, a second auxiliary diode Da3 and a second auxiliary winding La3. An anode of the first auxiliary diode Da2 is connected to the first terminal of the auxiliary capacitor Ca. The first auxiliary winding La2 is inductively coupled to the primary winding N1 and the secondary winding N2, wherein a terminal of the first auxiliary winding La2 is connected to a cathode of the first auxiliary diode Da2, and another terminal of the first auxiliary winding La2 is connected to the second terminal of the auxiliary capacitor Ca. An anode of the second auxiliary diode Da3 is connected to the first terminal of the auxiliary capacitor Ca. A terminal of the second auxiliary winding La3 is connected to a cathode of the second auxiliary diode Da3, and another terminal of the second auxiliary winding La3 is connected to the second terminal of the auxiliary capacitor Ca. The second auxiliary winding La3 is inductively coupled to the energy storage inductor L1.

Please refer to FIG. 11 and FIG. 12A to FIG. 12D, wherein FIG. 12A to FIG. 12D illustrate a first operation mode, a second operation mode, a third operation mode and a fourth operation mode of the forward converter of FIG. 11, respectively.

Figure 12A:
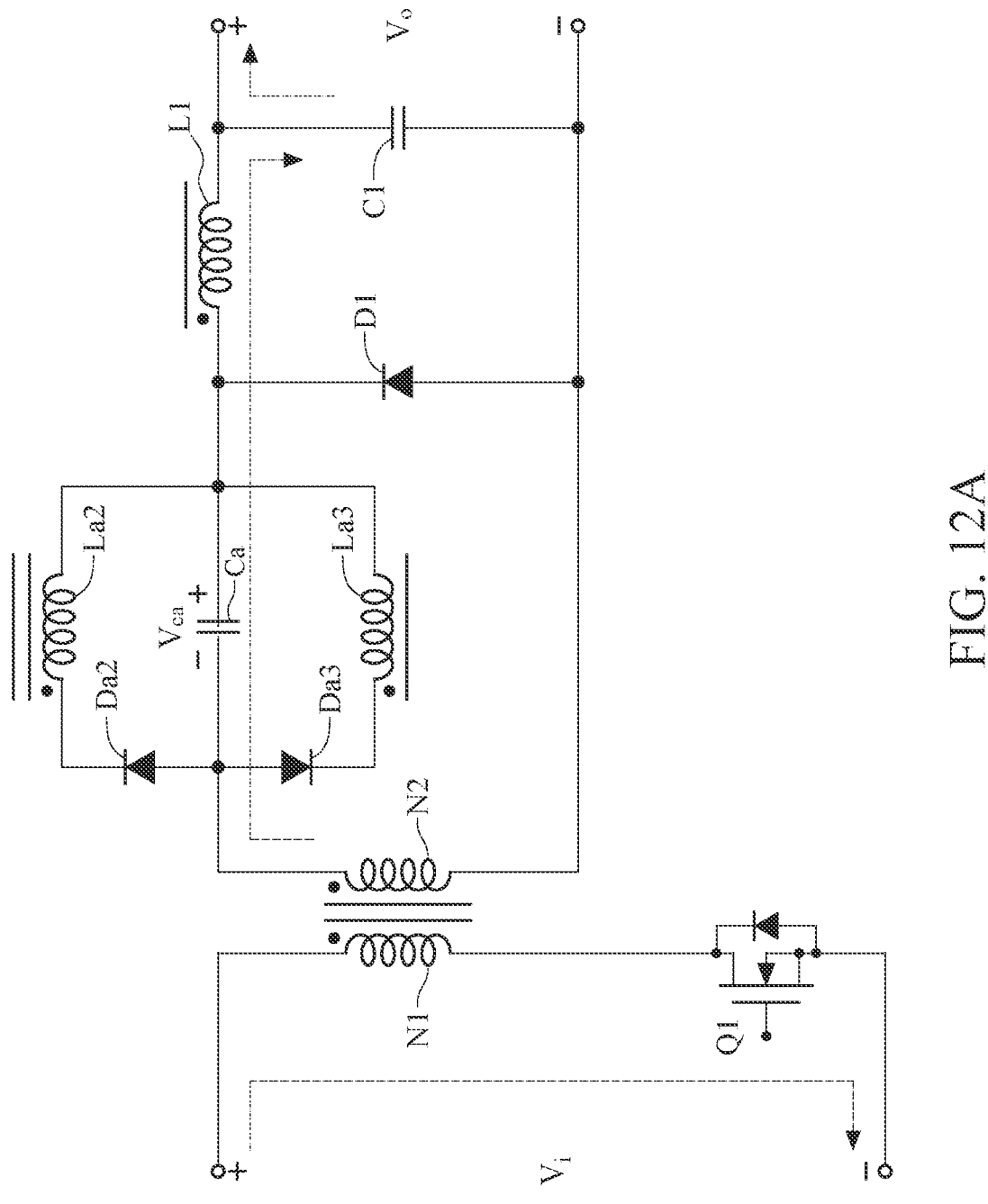
FIG. 12A to FIG. 12D illustrate a first operation mode, a second operation mode, a third operation mode and a fourth operation mode of the forward converter of FIG. 11, respectively.

Please refer to FIG. 12A, in the first operation mode, the active power switch element Q1 is turned on, the first auxiliary diode Da2 is cut off, the second auxiliary diode Da3 is cut off, and the fly wheeling diode D1 is cut off. When the active power switch element Q1 is turned on, the input voltage $V_i$ is provided to the primary winding N1 of the voltage conversion device 20_4. The induced voltage of the secondary winding N2 and the compensation voltage $V_{ca}$ of the auxiliary capacitor Ca of voltage conversion device 20_4 both charge the output capacitor C1. At the same time, the energy storage inductor L1 stores energy, the auxiliary capacitor Ca is in a discharge state. This operation mode continues until the active power switch element Q1 is cut off, and the second operation mode is entered.

Figure 12B:
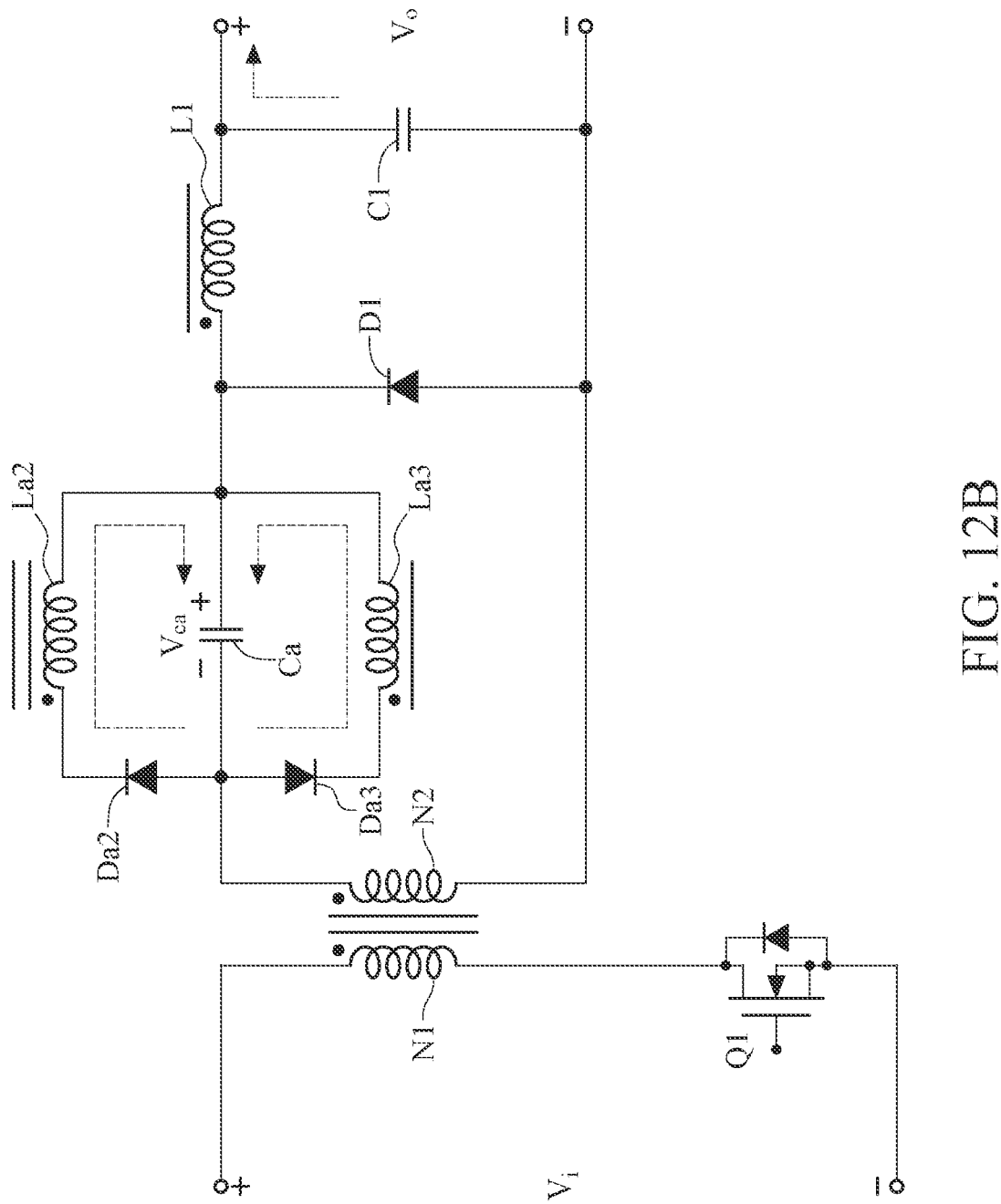

Please refer to FIG. 12B, in the second operation mode, the active power switch element Q1 is cut off, the first auxiliary diode Da2 is turned on, the second auxiliary diode Da3 is turned on, the fly wheeling diode D1 is cut off. Since the first auxiliary winding La2 is inductively coupled to the primary winding N1 and the secondary winding N2, by the inductor inductively coupled to the first auxiliary winding La2, the magnetized secondary winding N2 may release energy through the path formed from the first auxiliary diode Da2 to the auxiliary capacitor Ca to perform the demagnetization, and the auxiliary capacitor Ca may be charged to build the compensation voltage $V_{ca}$. Since the second auxiliary winding La3 is inductively coupled to the energy storage inductor L1, energy stored by the energy storage inductor L1 may be released from the second auxiliary winding La3 to charge the auxiliary capacitor Ca. Therefore, the compensation voltage $V_{ca}$ increases. This operation mode continues until the compensation voltage $V_{ca}$ is equal to the second mapped voltage, and the third operation mode is entered. The second mapped voltage is an equivalent voltage of the output voltage $V_o$ mapped to the second auxiliary winding La3 side according to a turn ratio of the energy storage inductor L1 and the second auxiliary winding La3.

Figure 12C:
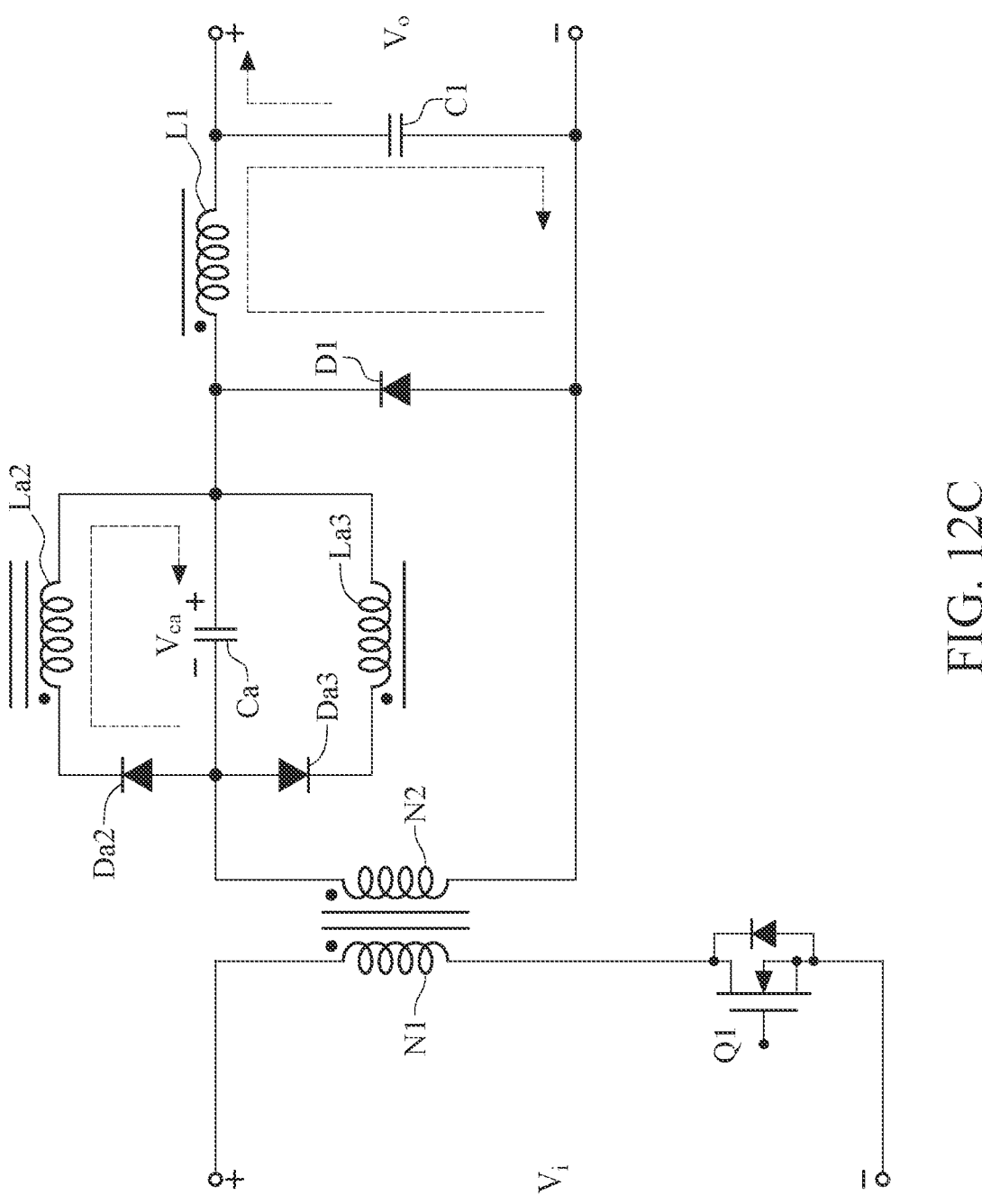

Please refer to FIG. 12C, in the third operation mode, the active power switch element Q1 is cut off, the first auxiliary diode Da2 is turned on, the second auxiliary diode Da3 is cut off, and the fly wheeling diode D1 is turned on. The magnetized secondary winding N2 continues to perform the demagnetization through the path formed from the first auxiliary diode Da2 to the auxiliary capacitor Ca, and continues to charge the auxiliary capacitor Ca to build the compensation voltage $V_{ca}$. The energy storage inductor L1 continues to release energy to charge the output capacitor C1. This operation mode continues until the magnetized secondary winding N2 and energy stored by the energy storage inductor L1 is completely released, and the fourth operation mode is entered.

Figure 12D:
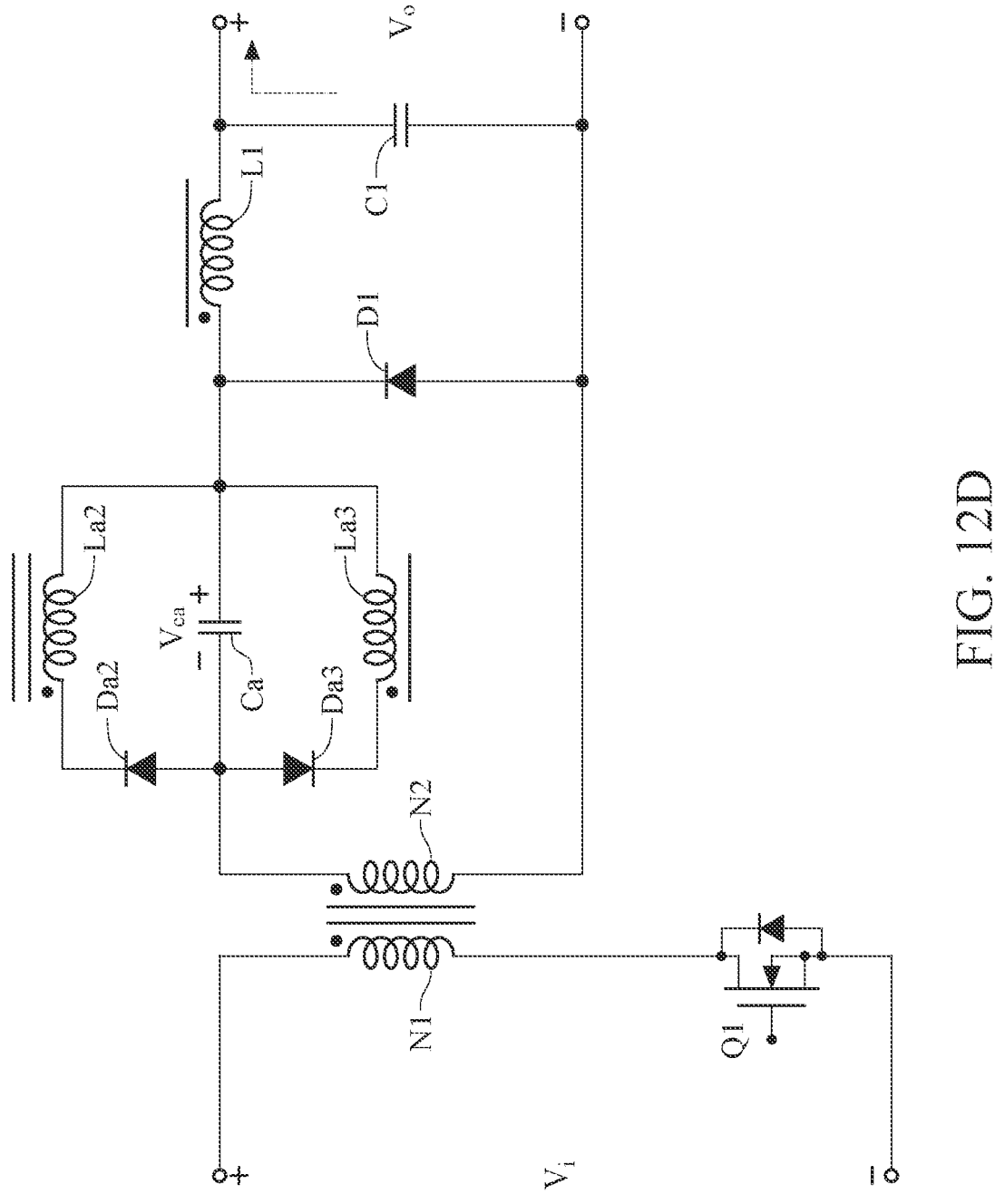

Please refer to FIG. 12D, after the magnetized secondary winding N2 and the energy storage inductor L1 completely releases the stored energy in the third operation mode, the currents on the auxiliary capacitor Ca and the energy storage inductor L1 are reduced to zero, and the first auxiliary diode Da2, the second auxiliary diode Da3 and the fly wheeling diode D1 are all in the cut-off state. The energy stored by the output capacitor C1 may continue to provide current to the load. When the active power switch element Q1 is triggered to be turned on again, energy stored by the auxiliary capacitor Ca is used to charge the output capacitor C1. That is, the forward converter 1_4 returns to the first operation mode. In particular, in an application where the forward converter of this embodiment is designed to operate in continuous current mode, the fourth operation mode may not need to exist. That is, after the third operation mode, the operation may directly return to the first operation mode.

Figure 13:
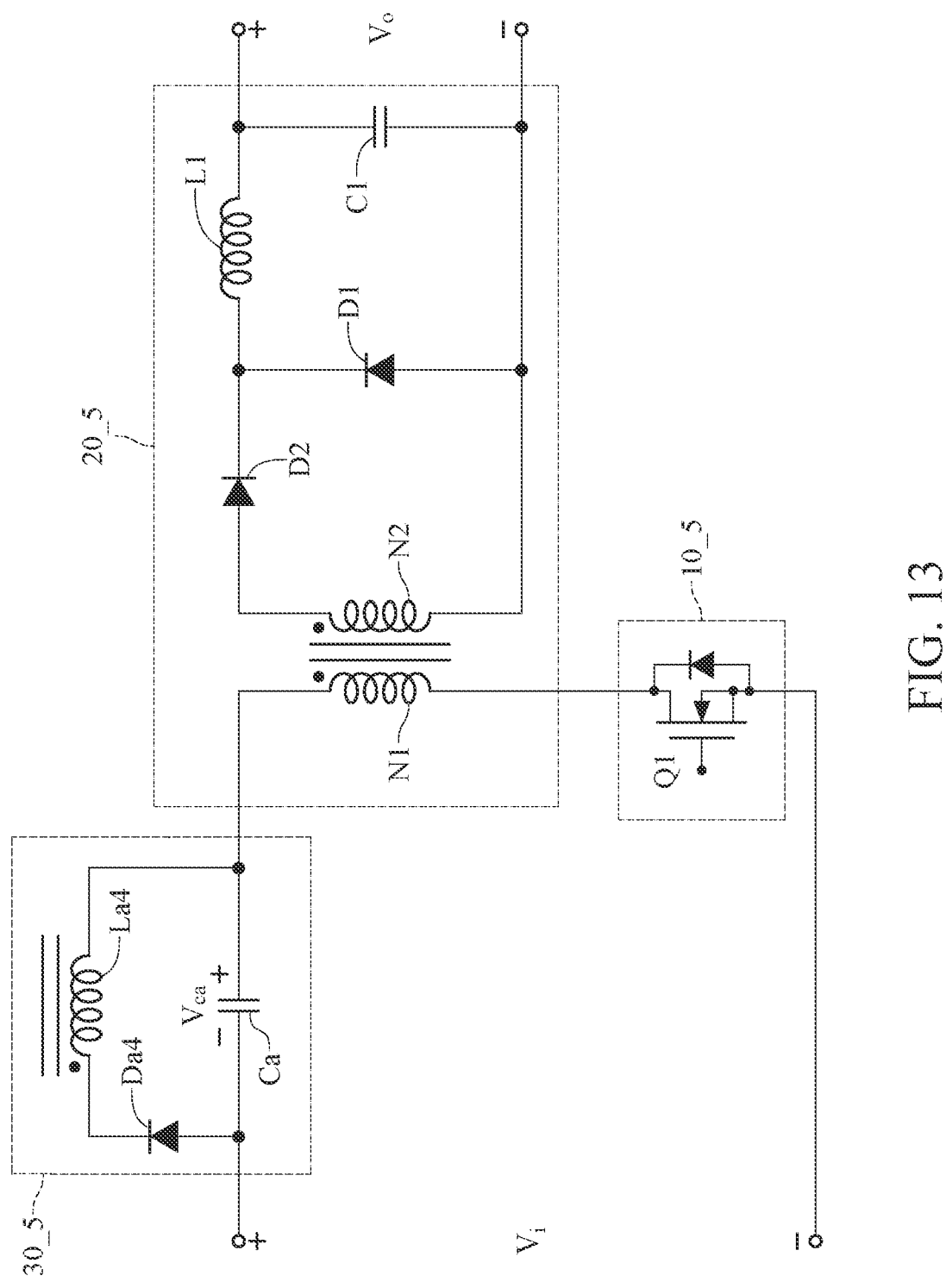
FIG. 13 is a circuit diagram of illustrating the forward converter according to a fifth embodiment of the present disclosure.

Please refer to FIG. 13, wherein FIG. 13 is a circuit diagram of illustrating the forward converter according to a fifth embodiment of the present disclosure. As shown in FIG. 13, the forward converter 1_5 includes a switch 10_5, a voltage conversion device 20_5 and an auxiliary device 30_5, wherein circuit/device implementations and functions of the switch 10_5 may all be the same as that of the switch 10_1 included in the forward converter 1_1 of FIG. 5, and their detail descriptions are not repeated herein.

In addition to the elements of the voltage conversion device 20_1 shown in FIG. 5, the voltage conversion device 20_5 of the forward converter 1_5 further includes another fly wheeling diode D2. An anode of the fly wheeling diode D2 is connected to the secondary winding N2, and a cathode of the fly wheeling diode D2 is connected to the second terminal of the energy storage inductor L1.

The auxiliary device 30_5 is disposed at the primary side of the forward converter 1_5. Furthermore, a terminal of the auxiliary device 30_5 is configured to receive the input voltage $V_i$, and another terminal of the auxiliary device 30_5 is connected to the primary winding N1. The auxiliary device 30_5 includes an auxiliary capacitor Ca, an auxiliary diode Da4 and an auxiliary winding La4. The first terminal of the auxiliary capacitor Ca is configured to receive the input voltage $V_i$, and the second terminal of the auxiliary capacitor Ca is connected to the primary winding N1. An anode of the auxiliary diode Da4 is connected to the first terminal of the auxiliary capacitor Ca. The auxiliary winding La4 is inductively coupled to the primary winding N1 and the secondary winding N2, wherein a terminal of the auxiliary winding La4 is connected to a cathode of the auxiliary diode Da4, and another terminal of the auxiliary winding La4 is connected to the second terminal of the auxiliary capacitor Ca.

Figure 14A:
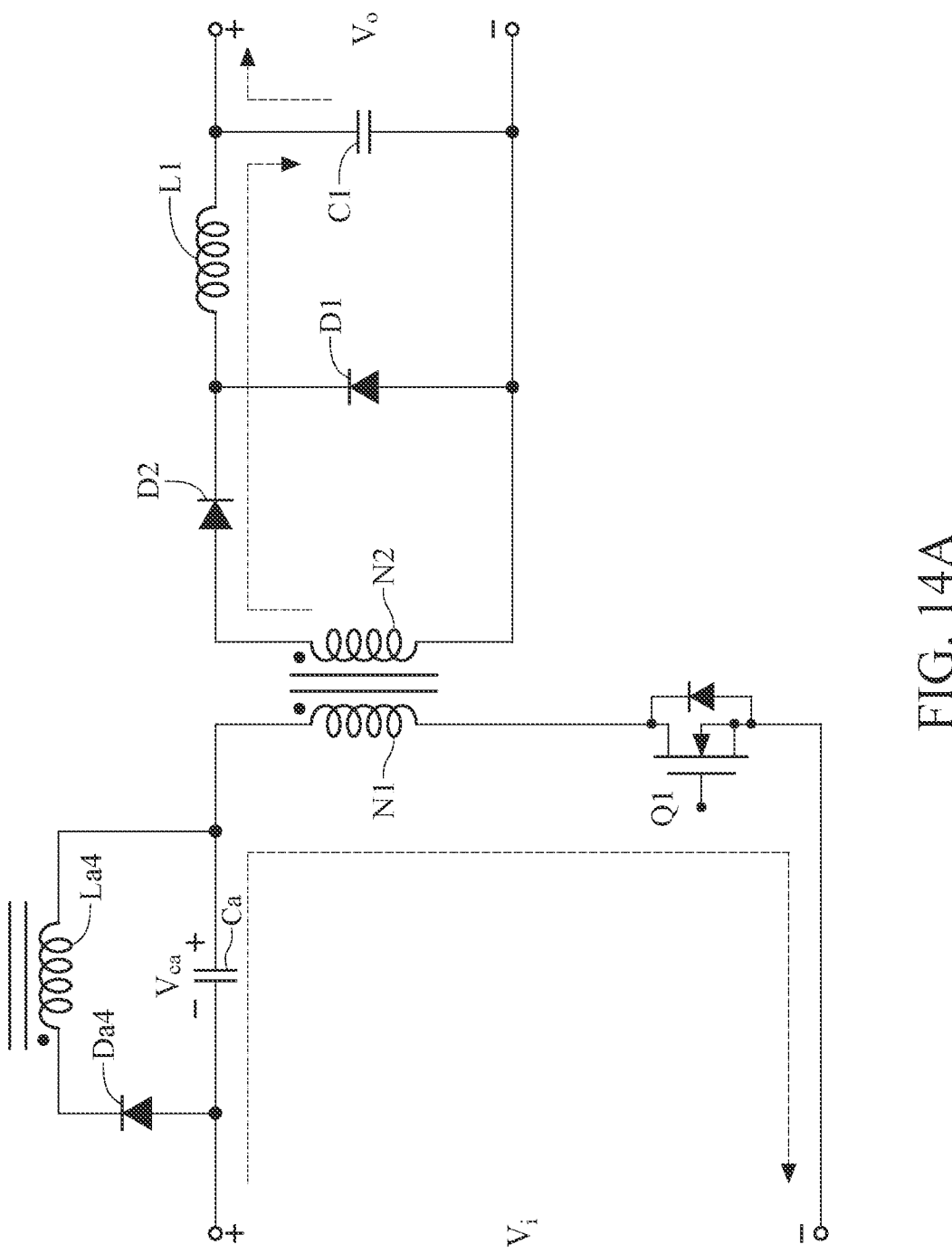
FIG. 14A to FIG. 14C illustrate a first operation mode, a second operation mode and a third operation mode of the forward converter of FIG. 13, respectively.
Figure 14B:
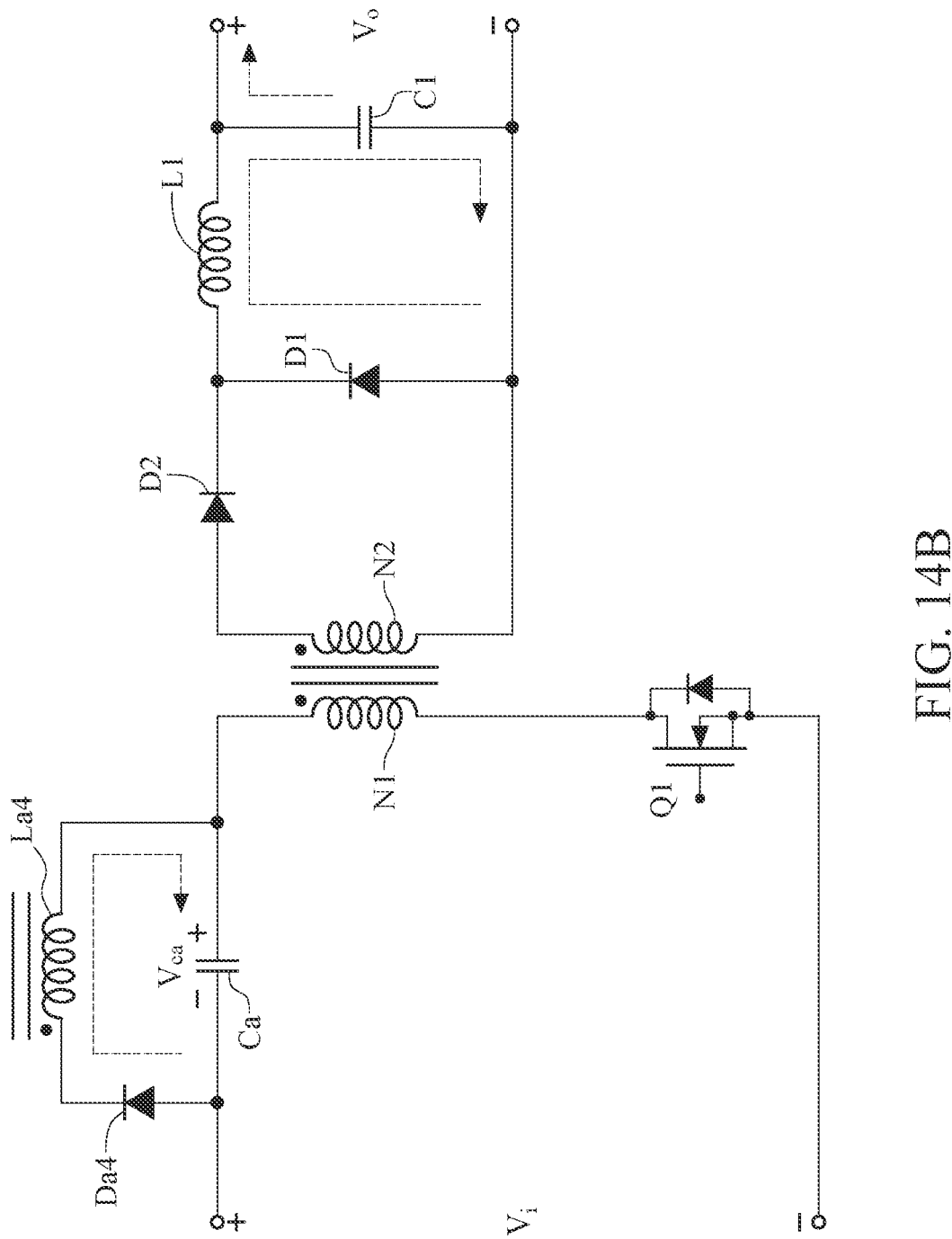
Figure 14C:
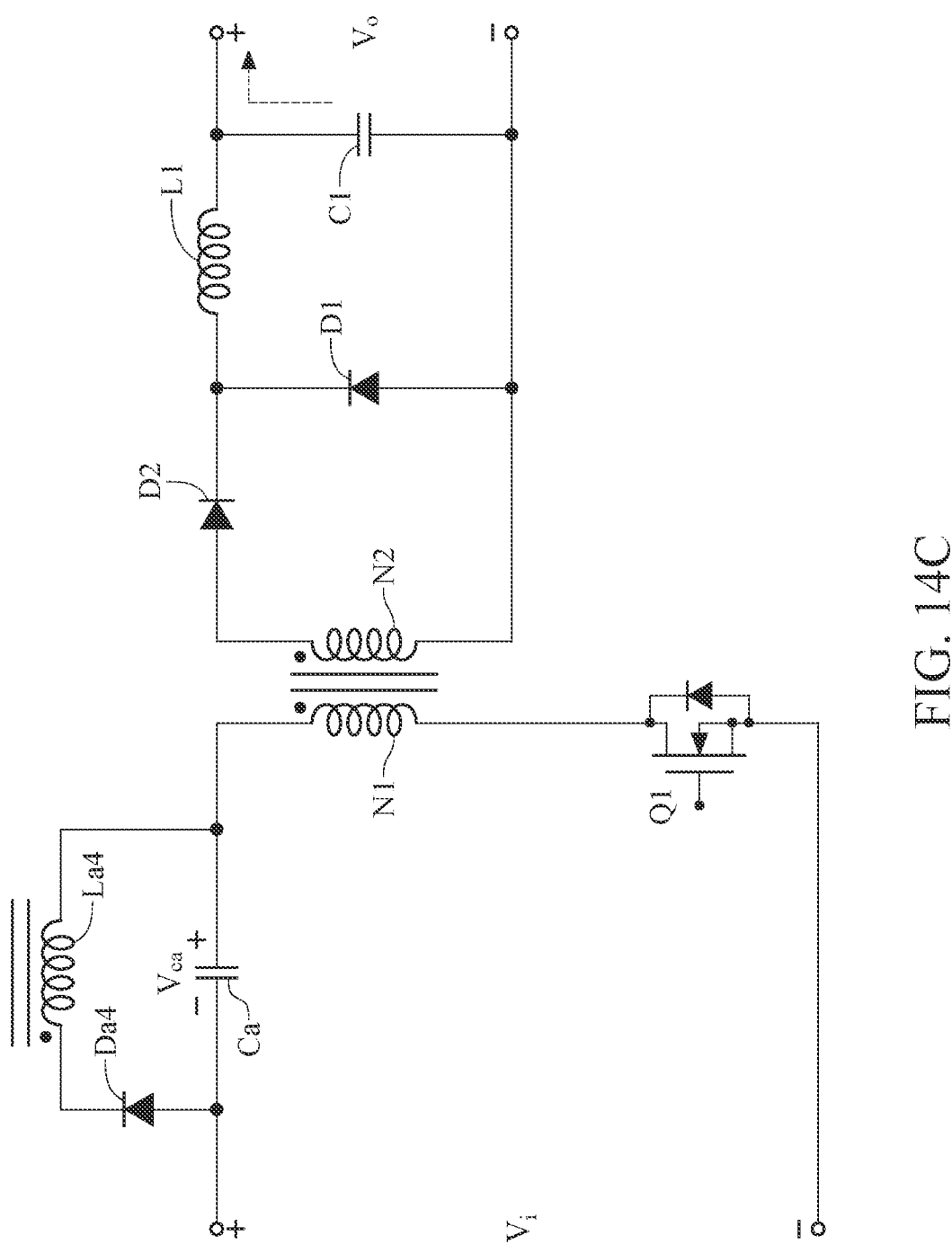

Please refer to FIG. 13 and FIG. 14A to FIG. 14C, wherein FIG. 14A to FIG. 14C illustrate a first operation mode, a second operation mode and a third operation mode of the forward converter of FIG. 13, respectively.

Please refer to FIG. 14A, in the first operation mode, the active power switch element Q1 is turned on, the auxiliary diode Da4 is cut off, the fly wheeling diode D1 is cut off, and the fly wheeling diode D2 is turned on. When the active power switch element Q1 is turned on, the input voltage $V_i$ and the auxiliary capacitor Ca charge the primary winding N1 of the voltage conversion device 20_5. The induced voltage of the secondary winding N2 of the voltage conversion device 20_5 charges the output capacitor C1 through the fly wheeling diode D2. At the same time, the energy storage inductor L1 stores energy, the auxiliary capacitor Ca is in a discharge state. This operation mode continues until the active power switch element Q1 is cut off, and the second operation mode is entered.

Please refer to FIG. 14B, in the second operation mode, the active power switch element Q1 is cut off, the auxiliary diode Da4 is turned on, the fly wheeling diode D1 is turned on, and the fly wheeling diode D2 is cut off. Since the auxiliary winding La4 is inductively coupled to the primary winding N1 and the secondary winding N2, energy stored by the primary winding N1 and the secondary winding N2 may be released from the auxiliary winding La4 to perform the demagnetization, and the auxiliary capacitor Ca may be charged to build the compensation voltage $V_{ca}$. The energy storage inductor L1 may release energy through the path formed from the output capacitor C1 and the fly wheeling diode D1. This operation mode continues until said demagnetization is completed, and the energy storage inductor L1 releases all energy. In particular, in some implementations, the demagnetization performed by the auxiliary winding La4 through the auxiliary diode Da4 and the auxiliary capacitor Ca and the energy release performed by the energy storage inductor L1 through the output capacitor C1 and the fly wheeling diode D1 may be completed at different timings. When the demagnetization of the auxiliary winding La4 and the energy release of the energy storage inductor L1 are both completed, the auxiliary device 30_5 enters the third operation mode.

Please refer to FIG. 14C, in the third operation mode, energy stored in the primary winding N1 and the secondary winding N2 is completely released, and energy stored in the energy storage inductor L1 is completely released in the second operation mode, the current on the energy storage inductor L1 is reduced to zero, the active power switch element Q1, the fly wheeling diodes D1 and D2 and the auxiliary diode Da4 all enter the cut-off state. When the active power switch element Q1 is triggered to be turned on again, energy stored by the auxiliary capacitor Ca is used to charge the output capacitor C1. That is, the forward converter 1_5 returns to the first operation mode. The energy stored by the output capacitor C1 may continue to provide current to the load. In particular, in an application where the forward converter of this embodiment is designed to operate in continuous current mode, the third operation mode may not need to exist. That is, after the second operation mode, the operation may directly return to the first operation mode.

Figure 15:
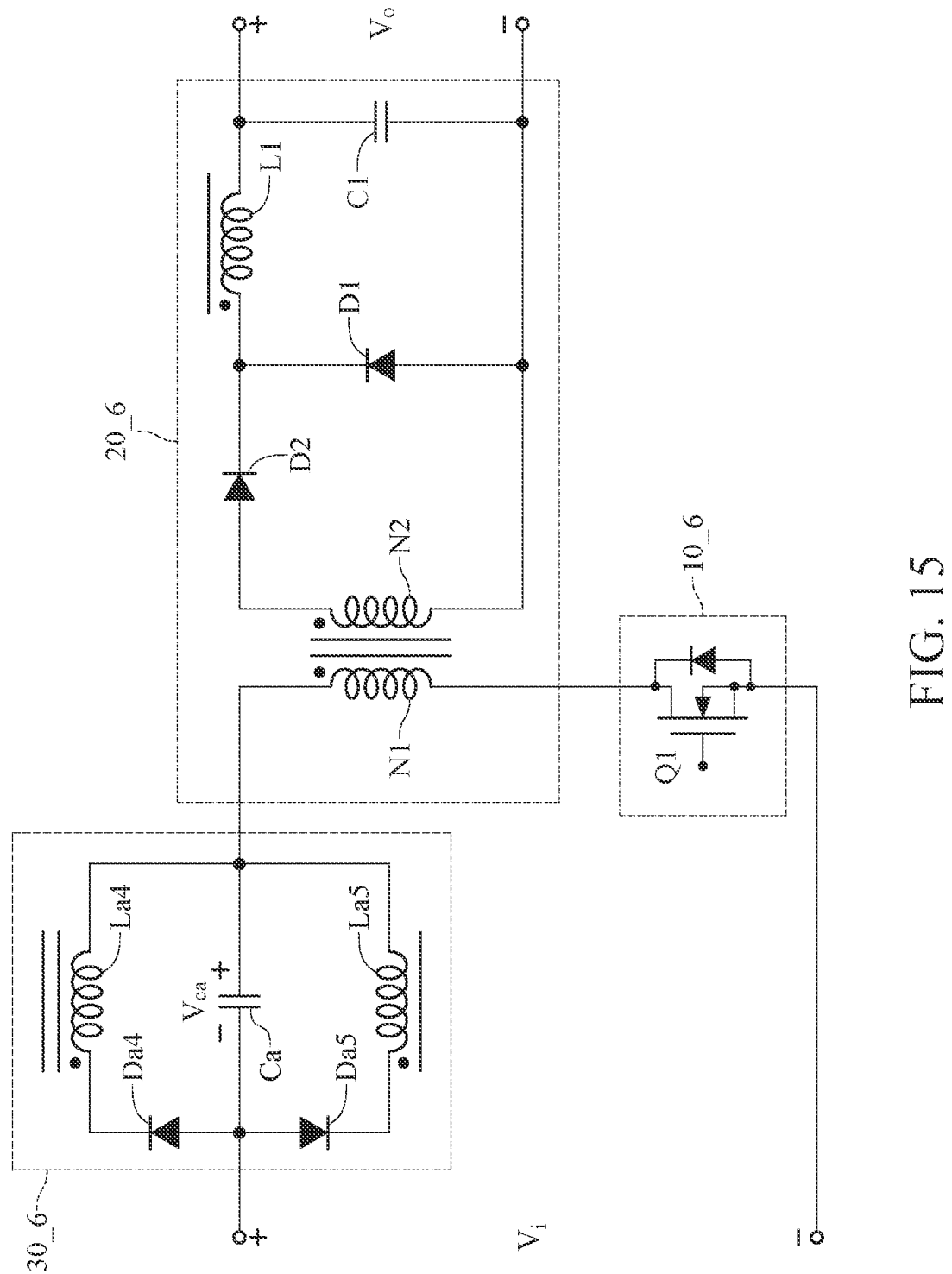
FIG. 15 is a circuit diagram of illustrating the forward converter according to a sixth embodiment of the present disclosure.

Please refer to FIG. 15, wherein FIG. 15 is a circuit diagram of illustrating the forward converter according to a sixth embodiment of the present disclosure. As shown in FIG. 15, the forward converter 1_6 includes a switch 10_6, a voltage conversion device 20_6 and an auxiliary device 30_6, wherein circuit/device implementations and functions of the switch 10_6 and the voltage conversion device 20_6 are the same as that of the switch 10_5 and the voltage conversion device 20_5 included in the forward converter 1_5 of FIG. 13, and their detail descriptions are not repeated herein.

The auxiliary device 30_6 is disposed at the primary side of the forward converter 1_6. The auxiliary device 30_6 includes an auxiliary capacitor Ca, a first auxiliary diode Da4, a second auxiliary diode Da5, a first auxiliary winding La4 and a second auxiliary winding La5. The first terminal of the auxiliary capacitor Ca is configured to receive the input voltage $V_i$, and the second terminal of the auxiliary capacitor Ca is connected to the primary winding N1. An anode of the first auxiliary diode Da4 is connected to the first terminal of the auxiliary capacitor Ca. The first auxiliary winding La4 is inductively coupled to the primary winding N1 and the secondary winding N2. A terminal of the first auxiliary winding La4 is connected to a cathode of the first auxiliary diode Da4, and another terminal of the first auxiliary winding La4 is connected to the second terminal of the auxiliary capacitor Ca. An anode of the second auxiliary diode Da5 is connected to the first terminal of the auxiliary capacitor Ca. The second auxiliary winding La5 is inductively coupled to the energy storage inductor L1. A terminal of the second auxiliary winding La5 is connected to a cathode of the second auxiliary diode Da5, and another terminal of the second auxiliary winding La5 is connected to the second terminal of the auxiliary capacitor Ca.

Please refer to FIG. 15 and FIG. 16A to FIG. 16D, wherein FIG. 16A to FIG. 16D illustrate a first operation mode, a second operation mode, a third operation mode and a fourth operation mode of the forward converter of FIG. 15, respectively.

Figure 16A:
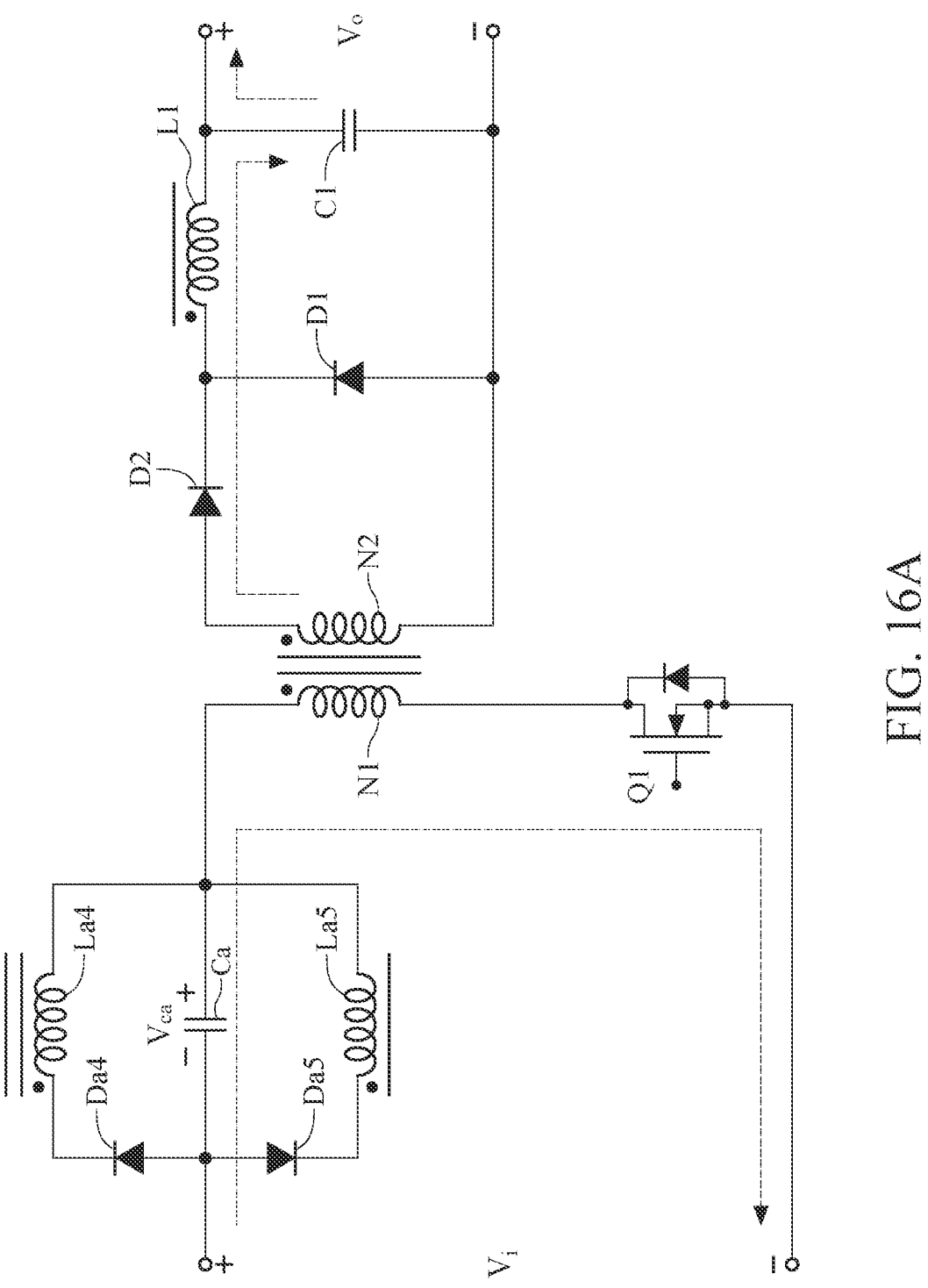
FIG. 16A to FIG. 16D illustrate a first operation mode, a second operation mode, a third operation mode and a fourth operation mode of the forward converter of FIG. 15, respectively.

Please refer to FIG. 16A, in the first operation mode, the active power switch element Q1 is turned on, the first auxiliary diode Da4 is cut off, the second auxiliary diode Da5 is cut off, the fly wheeling diode D1 is cut off, and the fly wheeling diode D2 is turned on. When the active power switch element Q1 is turned on, the input voltage $V_i$ and the auxiliary capacitor Ca charge the primary winding N1 of the voltage conversion device 20_6. The induced voltage of the secondary winding N2 of the voltage conversion device 20_6 charges the output capacitor C1. At the same time, the energy storage inductor L1 stores energy, the auxiliary capacitor Ca is in a discharge state. This operation mode continues until the active power switch element Q1 is cut off, and the second operation mode is entered.

Figure 16B:
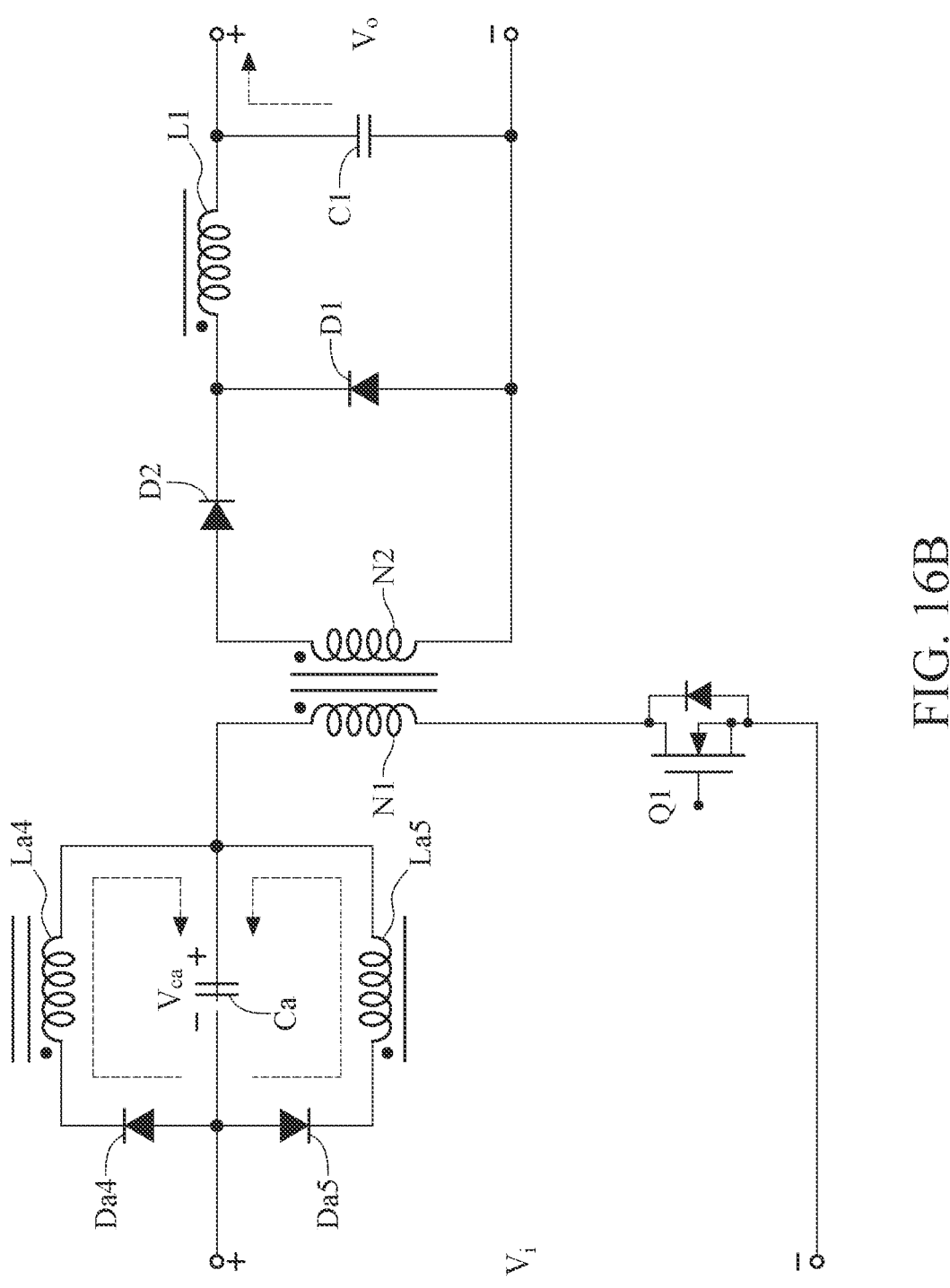

Please refer to FIG. 16B, in the second operation mode, the active power switch element Q1 is cut off, the first auxiliary diode Da4 is turned on, the second auxiliary diode Da5 is turned on, the fly wheeling diodes D1 and D2 are cut off. After the active power switch element Q1 is cut off, since the first auxiliary winding La4 is inductively coupled to the primary winding N1 and the secondary winding N2, energy stored by the primary winding N1 and the secondary winding N2 may be used to perform the demagnetization through the path formed from the first auxiliary diode Da4 to the auxiliary capacitor Ca, and the auxiliary capacitor Ca may be charged to build the compensation voltage $V_{ca}$. Since the second auxiliary winding La5 is inductively coupled to the energy storage inductor L1, energy stored by the energy storage inductor L1 may charge the auxiliary capacitor Ca through the second auxiliary winding La5 by the path formed from the second auxiliary diode Da5 to the auxiliary capacitor Ca to build the compensation voltage $V_{ca}$. Therefore, the compensation voltage $V_{ca}$ increases. This operation mode continues until the compensation voltage $V_{ca}$ is equal to the third mapped voltage, and the third operation mode is entered. The third mapped voltage is an equivalent voltage of the output voltage $V_o$ mapped to the second auxiliary winding La5 side according to a turn ratio of the energy storage inductor L1 and the second auxiliary winding La5.

Figure 16C:
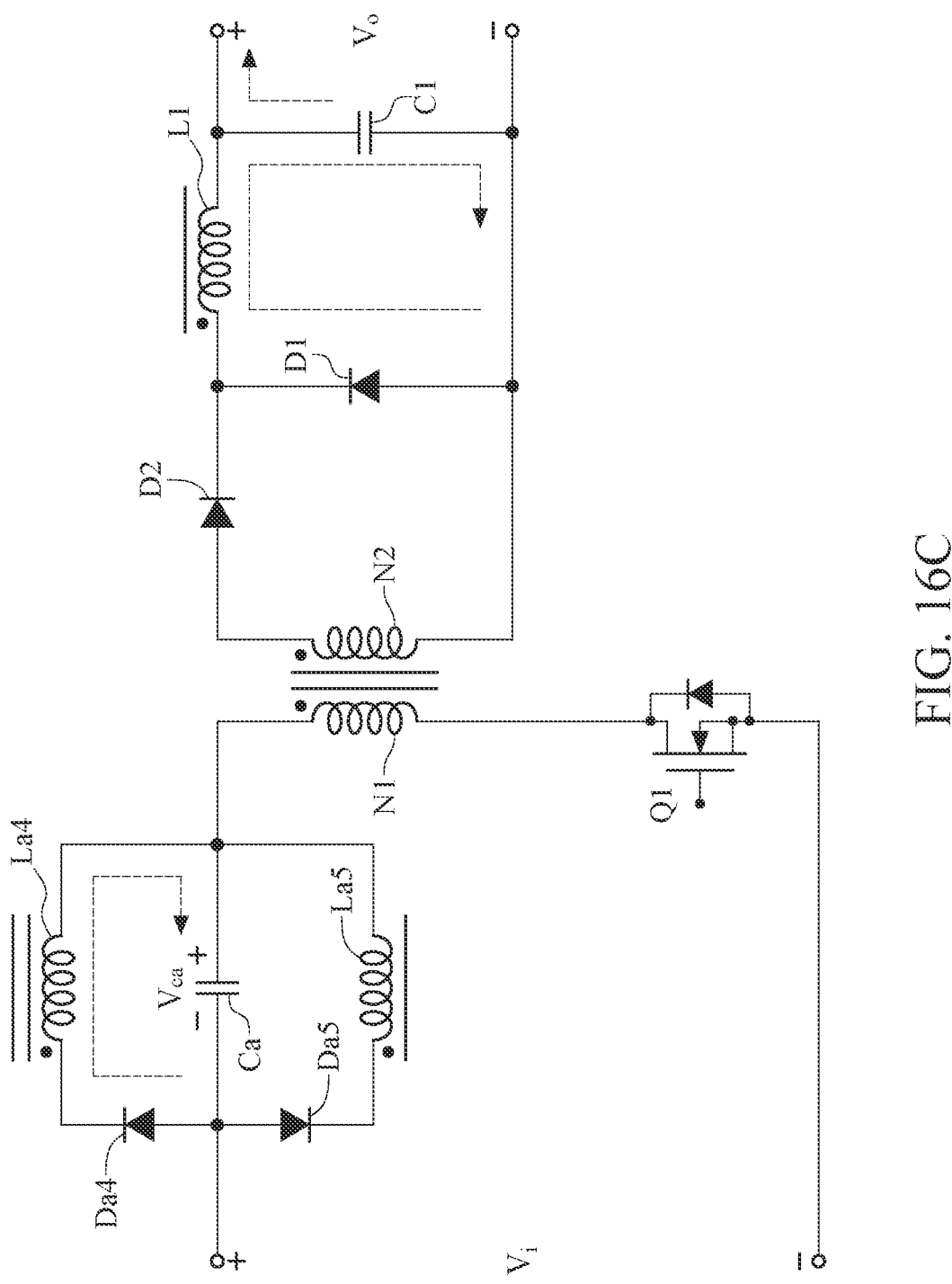

Please refer to FIG. 16C, in the third operation mode, the active power switch element Q1 is cut off, the first auxiliary diode Da4 is turned on, the second auxiliary diode Da5 is cut off, the fly wheeling diode D1 is turned on, and the fly wheeling diode D2 is cut off. The first auxiliary winding La4 continues to perform the demagnetization through the path formed from the first auxiliary diode Da4 to the auxiliary capacitor Ca, and continues to charge the auxiliary capacitor Ca to build the compensation voltage $V_{ca}$. Energy stored by the energy storage inductor L1 is released through the fly wheeling diode D1 to charge the output capacitor C1. This operation mode continues until energy stored by the first auxiliary winding La4 and the energy storage inductor L1 is completely released, and the fourth operation mode is entered.

Figure 16D:
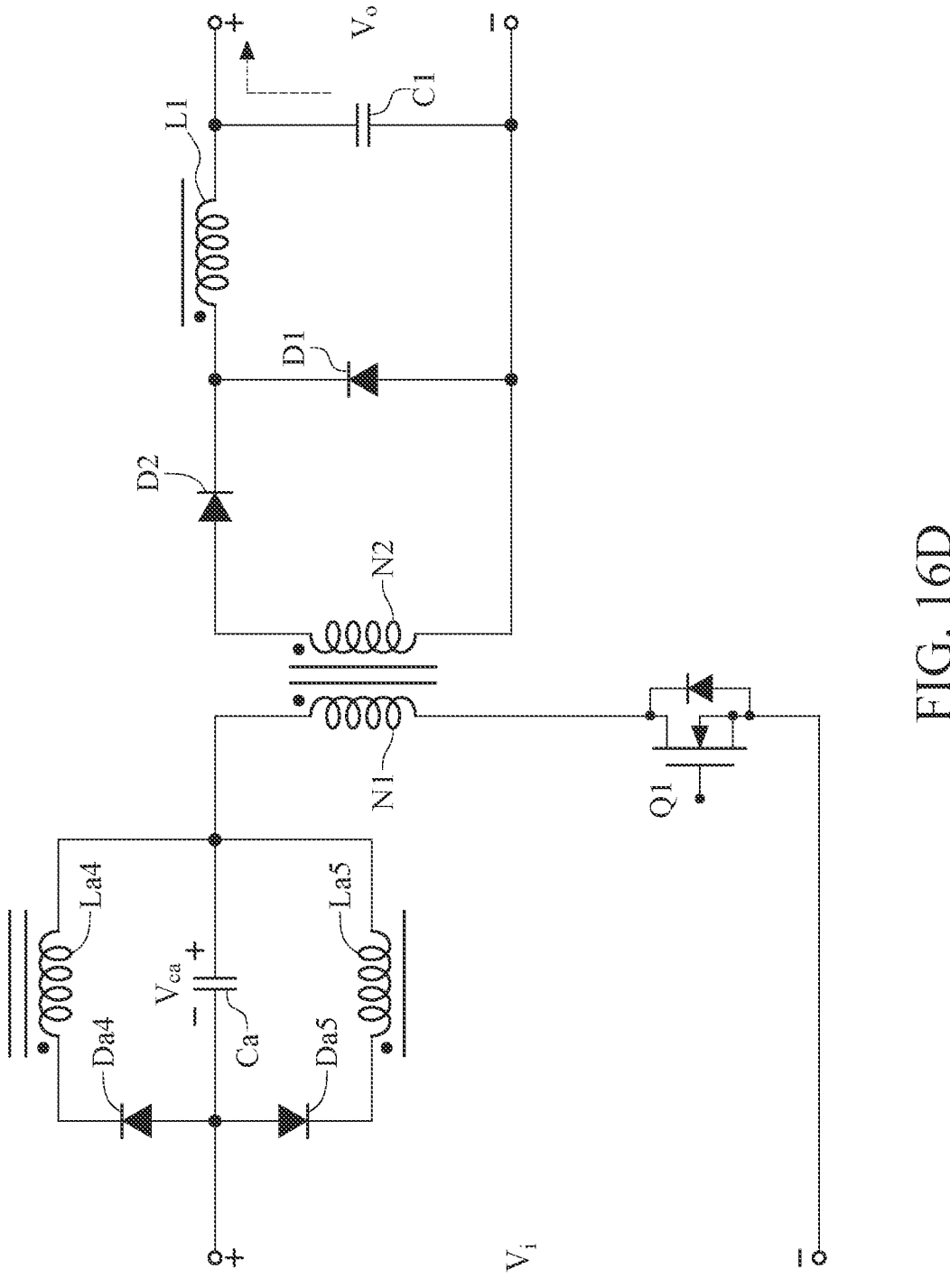

Please refer to FIG. 16D, after energy stored in the first auxiliary winding La4 and the energy storage inductor L1 is completely released in the third operation mode, the currents on the auxiliary capacitor Ca and the energy storage inductor L1 are reduced to zero, and the first auxiliary diode Da4, the second auxiliary diode Da5 and the fly wheeling diodes D1 and D2 all enter the cut-off state, and the active power switch element Q1 is still in the cut-off state. The energy stored by the output capacitor C1 may continue to provide current to the load. When the active power switch element Q1 is triggered to be turned on again, energy stored by the auxiliary capacitor Ca is used to charge the output capacitor C1. That is, the forward converter 1_6 returns to the first operation mode. In particular, in an application where the forward converter of this embodiment is designed to operate in continuous current mode, the fourth operation mode may not need to exist. That is, after the third operation mode, the operation may directly return to the first operation mode.

It may be known from the above embodiments that the forward converter and the auxiliary device of the present disclosure may be summarized into various implementations as follows. In the first implementation, the forward converter and the auxiliary device include the auxiliary capacitor. In the second implementation, the auxiliary device includes the auxiliary capacitor, the auxiliary diode and the auxiliary winding, wherein the anode of the auxiliary diode is connected to the first terminal of the auxiliary capacitor, the auxiliary winding is inductively coupled to the primary winding and the secondary winding, and a terminal of the auxiliary winding is connected to the cathode of the auxiliary diode, and another terminal of the auxiliary winding is connected to the second terminal of the auxiliary capacitor. In the third implementation, the voltage conversion device further includes the energy storage inductor configured to output the output voltage, and the auxiliary device includes the auxiliary capacitor, the auxiliary diode and the auxiliary winding, wherein the anode of the auxiliary diode is connected to the first terminal of the auxiliary capacitor, the auxiliary winding is inductively coupled to the energy storage inductor, a terminal of the auxiliary winding is connected to the cathode of the auxiliary diode, and another terminal of the auxiliary winding is connected to the second terminal of the auxiliary capacitor. In the fourth implementation, the voltage conversion device further includes the energy storage inductor configured to output the output voltage, and the auxiliary device includes the auxiliary capacitor, the first auxiliary diode, the second auxiliary diode, the first auxiliary winding and the second auxiliary winding, the anode of the first auxiliary diode is connected to the first terminal of the auxiliary capacitor, the first auxiliary winding is inductively coupled to the primary winding and the secondary winding, a terminal of the first auxiliary winding is connected to the cathode of the first auxiliary diode, another terminal of the first auxiliary winding is connected to the second terminal of the auxiliary capacitor, the anode of the second auxiliary diode is connected to the first terminal of the auxiliary capacitor, the second auxiliary winding is inductively coupled to the energy storage inductor, a terminal of the second auxiliary winding is connected to the cathode of the second auxiliary diode, and another terminal of the second auxiliary winding is connected to the second terminal of the auxiliary capacitor.

The auxiliary device of the above implementations may be connected to the primary winding or the secondary winding, wherein the primary winding is especially adapted to the second implementation to the fourth implementation. It should be noted that by connecting the auxiliary device to the secondary winding, a diode may not need to be disposed between the energy storage inductor and the secondary winding of the voltage conversion device of the forward converter. Therefore, comparing to the structure of the auxiliary device connected to the primary winding, the present disclosure may have a simpler circuit structure.

Figure 17:
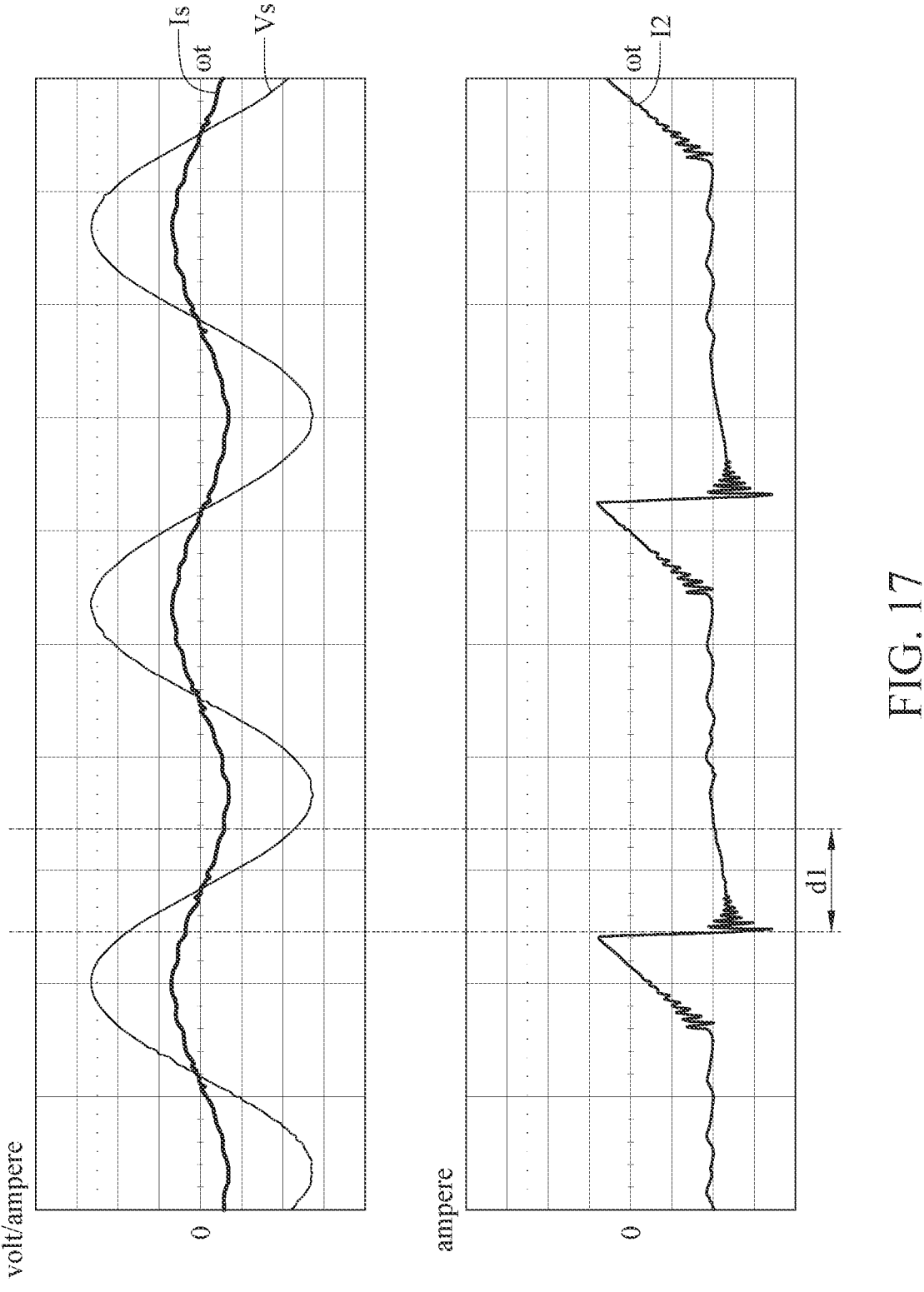
FIG. 17 exemplarily presents the waveform diagrams of the gate-source voltage, the flowing current and the drain-source voltage of the switch of the forward converter according to an embodiment of the present disclosure.

Please refer to FIG. 17, wherein FIG. 17 exemplarily presents the waveform diagrams of the voltage and the current at an alternating-current (AC) input terminal the secondary-side current of the forward power factor corrector of the forward converter according to an embodiment of the present disclosure. As shown in FIG. 17, the voltage Vs at the AC input terminal and the current Is at the AC input terminal match each other, there is low current harmonics. In addition, according to a demagnetization interval d1 of the secondary-side current I2, it may be known that the forward power factor corrector may effectively perform demagnetization.

Figure 18:
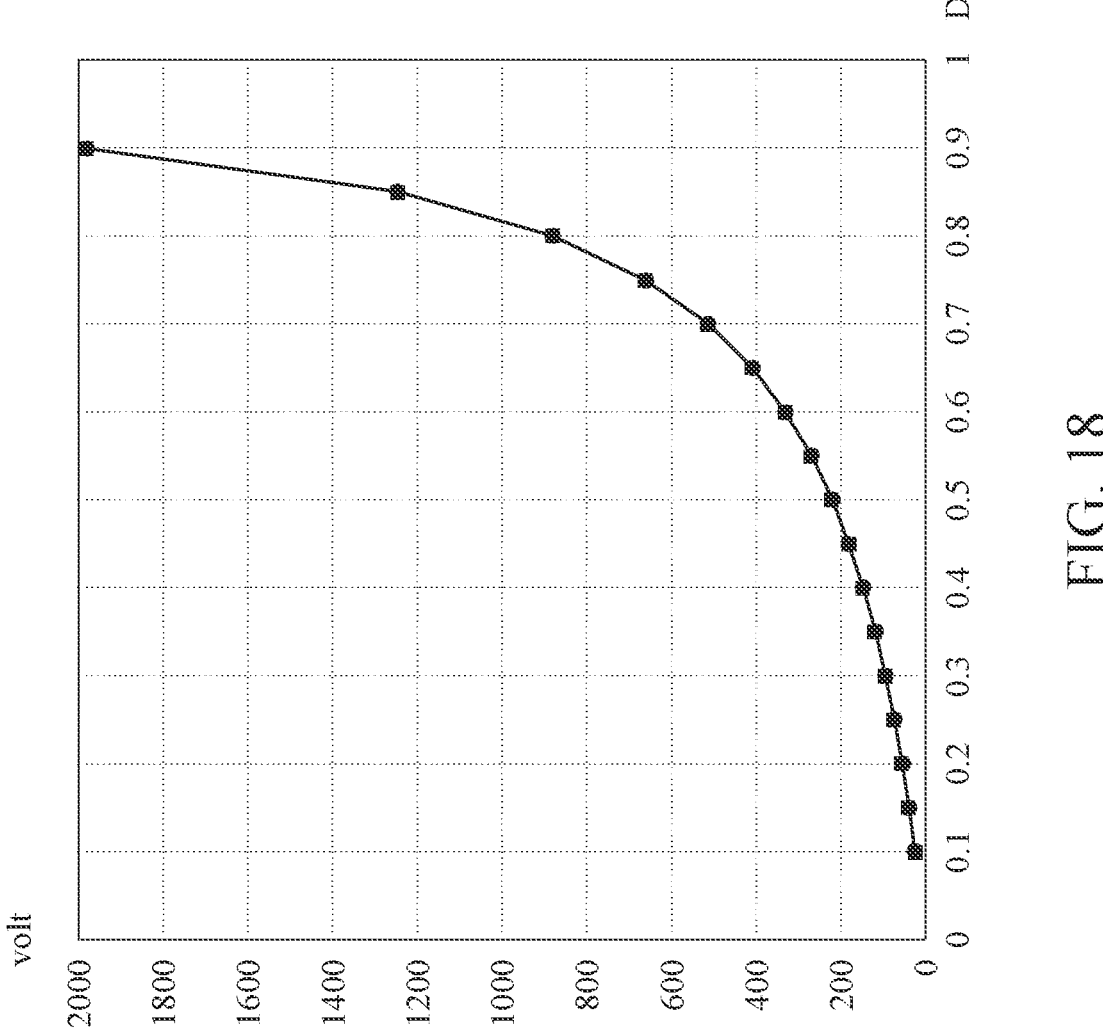
FIG. 18 exemplarily presents the relationship between the output voltage and the switching duty cycle of the forward power factor corrector according to an embodiment of the present disclosure.

Please refer to FIG. 18, wherein FIG. 18 exemplarily presents relationship between duty cycle of the switch and the output voltage of the forward power factor corrector according to an embodiment of the present disclosure. The relationship between the duty cycle of the switch and the output voltage of the output voltage may be presented with the following equation 1:

$$V_o = \frac{D}{1-D}|V_s| \qquad \text{equation 1}$$

wherein $V_o$ is the output voltage, $V_s$ is the voltage of the AC input, as shown in FIG. 2, and D is the duty cycle of the switch.

In view of the above description, with the auxiliary device, the forward converter according to one or more embodiments of the present disclosure may have the advantages of high conversion efficiency, meet the demagnetization requirements of the windings of a voltage converter, be able to provide compensation voltage, be smaller in size and light in weight, and may do so without adding additional complex and high-cost structure. The forward power factor corrector including the forward converter described above of the present disclosure, in addition to the above advantageous, may also reduce the current dead zone through the compensation voltage of the auxiliary device, and may achieve the effects of high power factor and low harmonic rate.

What is claimed is:

1. A forward converter, comprising:
a voltage conversion device comprising a primary winding and a secondary winding and configured to convert an input voltage into an output voltage;
a switch connected to the voltage conversion device and configured to be switched to make the voltage conversion device receive or not receive the input voltage; and
an auxiliary device connected to the voltage conversion device, storing electrical energy released by the voltage conversion device and generating a compensation voltage when the switch is cut off, and providing the compensation voltage when the switch is turned on, wherein the compensation voltage and the input voltage have same polarity,
wherein the auxiliary device comprises:
an auxiliary capacitor;
an auxiliary diode, wherein an anode of the auxiliary diode is connected to a first terminal of the auxiliary capacitor; and
an auxiliary winding inductively coupled to the primary winding and the secondary winding, wherein a terminal of the auxiliary winding is connected to a cathode of the auxiliary diode, and another terminal of the auxiliary winding is connected to a second terminal of the auxiliary capacitor.

2. The forward converter according to claim 1, wherein the voltage conversion device further comprises an energy storage inductor configured to output the output voltage, the auxiliary diode is a first auxiliary diode, the auxiliary winding is a first auxiliary winding, and the auxiliary device further comprises:

a second auxiliary diode, wherein an anode of the second auxiliary diode is connected to the first terminal of the auxiliary capacitor; and a second auxiliary winding inductively coupled to the energy storage inductor, wherein a terminal of the second auxiliary winding is connected to a cathode of the second auxiliary diode, and another terminal of the second auxiliary winding is connected to the second terminal of the auxiliary capacitor.

3. The forward converter according to claim 1, wherein the voltage conversion device further comprises an energy storage inductor configured to output the output voltage.

4. The forward converter according to claim 1, wherein the voltage conversion device further comprises an energy storage inductor, a first terminal of the energy storage inductor configured to output the output voltage, a terminal of the auxiliary device is connected to the secondary winding, and another terminal of the auxiliary device is connected to a second terminal of the energy storage inductor.

5. The forward converter according to claim 4 wherein the first terminal of the auxiliary capacitor is connected to the secondary winding, the second terminal of the auxiliary capacitor is connected to the second terminal of the energy storage inductor.

6. The forward converter according to claim 1, wherein the auxiliary diode is a first auxiliary diode, the auxiliary winding is a first auxiliary winding, and the auxiliary device further comprises:

a second auxiliary diode, wherein an anode of the second auxiliary diode is connected to the first terminal of the auxiliary capacitor; and a second auxiliary winding inductively coupled to the energy storage inductor, wherein a terminal of the second auxiliary winding is connected to a cathode of the second auxiliary diode, and another terminal of the second auxiliary winding is connected to the second terminal of the auxiliary capacitor.

7. The forward converter according to claim 1, wherein a terminal of the auxiliary device is configured to receive the input voltage, and another terminal of the auxiliary device is connected to the primary winding.

8. The forward converter according to claim 7 wherein the first terminal of the auxiliary capacitor is configured to receive the input voltage, and the second terminal of the auxiliary capacitor is connected to the primary winding.

9. The forward converter according to claim 8, wherein the voltage conversion device further comprises an energy storage inductor configured to output the output voltage, the auxiliary diode is a first auxiliary diode, the auxiliary winding is a first auxiliary winding, and the auxiliary device further comprises:

a second auxiliary diode, wherein an anode of the second auxiliary diode is connected to the first terminal of the auxiliary capacitor; and a second auxiliary winding inductively coupled to the energy storage inductor, wherein a terminal of the second auxiliary winding is connected to a cathode of the second auxiliary diode, and another terminal of the second auxiliary winding is connected to the second terminal of the auxiliary capacitor.

10. A forward power factor corrector, comprising:

the forward converter according to claim 1; and a rectifying device connected to the forward converter and configured to receive and rectify a power source to generate the input voltage.

* * * * *